US012349262B2

(12) United States Patent
Ohodnicki, Jr. et al.

(10) Patent No.: US 12,349,262 B2
(45) Date of Patent: Jul. 1, 2025

(54) IN-LINE MICROWAVE PROCESSING OF ALLOYS

(71) Applicants: The Penn State Research Foundation, University Park, PA (US); United States Department Of Energy, Washington, DC (US)

(72) Inventors: Paul R. Ohodnicki, Jr., Allison Park, PA (US); Kevin Byerly, Pittsburgh, PA (US); Dinesh Agrawal, State College, PA (US); Michael Lanagan, State College, PA (US)

(73) Assignees: The Penn State Research Foundation, University Park, PA (US); United States Department of Energy, Washington, DC (US)

( * ) Notice: Subject to any disclaimer, the term of this patent is extended or adjusted under 35 U.S.C. 154(b) by 942 days.

(21) Appl. No.: 17/254,163

(22) PCT Filed: Jun. 19, 2019

(86) PCT No.: PCT/US2019/038023
§ 371 (c)(1),
(2) Date: Dec. 18, 2020

(87) PCT Pub. No.: WO2019/246290
PCT Pub. Date: Dec. 26, 2019

(65) Prior Publication Data

US 2021/0329751 A1 Oct. 21, 2021

Related U.S. Application Data

(60) Provisional application No. 62/687,114, filed on Jun. 19, 2018.

(51) Int. Cl.
*H05B 6/80* (2006.01)
*C21D 1/26* (2006.01)
(Continued)

(52) U.S. Cl.
CPC ................ *H05B 6/80* (2013.01); *C21D 1/26* (2013.01); *C21D 1/34* (2013.01); *C21D 11/00* (2013.01); *C22F 1/00* (2013.01); *H05B 6/68* (2013.01)

(58) Field of Classification Search
None
See application file for complete search history.

(56) References Cited

U.S. PATENT DOCUMENTS 5,296,666 A 3/1994 Varadan et al.
5,632,921 A 5/1997 Risman et al.
(Continued)

FOREIGN PATENT DOCUMENTS

JP 2016157812 A * 9/2016

OTHER PUBLICATIONS

Nicula, Scripta Materialia. vol. 60, p. 120-123. (Year: 2009).*
(Continued)

*Primary Examiner* — Xiaowei Su
(74) *Attorney, Agent, or Firm* — Fish & Richardson P.C.

(57) ABSTRACT

Methods and systems including a microwave radiation source are described. A first region of a pure magnetic field can be generated in a first processing zone using a microwave radiation source of the first processing zone. The first processing zone can be a single mode microwave radiation chamber. A second region of a pure electric field can be generated in the first processing zone using the microwave radiation source. The second region can be spatially distinct from the first region. A first portion of an amorphous alloy can be loaded automatically into the first processing zone. The first portion can be positioned in an annealing region. The annealing region can be a single field region selected from the first region and the second region. The first portion
(Continued)

can be heated in the annealing region. The first portion can be automatically unloaded from the first processing zone.

16 Claims, 13 Drawing Sheets

(51) Int. Cl.

| | |
|---|---|
| ***C21D 1/34*** | (2006.01) |
| ***C21D 11/00*** | (2006.01) |
| ***C22F 1/00*** | (2006.01) |
| ***H05B 6/68*** | (2006.01) |

(56) References Cited

U.S. PATENT DOCUMENTS

| | | | | |
|---|---|---|---|---|
| 6,172,322 | B1 | 1/2001 | Shang et al. | |
| 6,365,885 | B1 | 4/2002 | Roy et al. | |
| 6,610,241 | B2 | 8/2003 | Shrout et al. | |
| 6,884,328 | B2 | 4/2005 | Litvinov et al. | |
| 11,008,643 | B2 | 5/2021 | Leary et al. | |
| 2012/0262266 | A1* | 10/2012 | Herzer ................ | H01F 1/14766 977/773 |
| 2014/0321798 | A1 | 10/2014 | Chen et al. | |
| 2016/0319412 | A1 | 11/2016 | Leary et al. | |

OTHER PUBLICATIONS

Machine translation of JP2016-157812. (Year: 2016).*
Definition of thermal stress. (Year: 2024).*
Allia et al., "Joule-heating effects in the amorphous Fe40Ni40B20 alloy", Phys. Rev. B, Feb. 1993, 47(6):3118-3125.
Allia et al., "Soft nanocrystalline ferromagnetic alloys with improved ductility obtained through de Joule heating of amorphous ribbons," J. Magn. Magn. Materials, May 1994, 133(1-3):243-247.
Barglik, "Induction Heating of Thin Strips in Transverse Flux Magnetic Field," in Advances in Induction and Microwave Heating of Mineral and Organic Materials, Grundas (ed.), Feb. 14, 2011, Chapter 10, 207-232.
Byerly et al., "Metal Amorphous Nanocomposite (MANC) Alloy Cores with Spatially Tuned Permeability for Advanced Power Magnetic Applications," JOM, Apr. 25, 2018, 70:879-891.
Cheng et al., "Experimental proof of major role of magnetic field losses in microwave heating of metal and metallic composites," J. Mater. Sci. Letters, Sep. 2001, 20:1561-1563.
Feteira et al., "BaTiO3-Based Ceramics for Tunable Microwave Applications," J. Am. Ceram. Society, Jun. 2004, 87(6):1082-1087.
Goto et al., "Control of Magnetic Properties of NiMn2O4 by a Microwave Magnetic Field under Air," Materials, Mar. 4, 2016, 9(3):169, 9 pages.
Hosseini-Nasab, "Kinetics of crystallization in FeB based nanocrystalline soft magnetic alloys," J. Magn. Magn. Materials, Jun. 2016, 407:13-16.
Joshi, "Tensile behavior of laser treated Fe—Si—B metallic glass," J. Appl. Physics, Oct. 27, 2015, 118(16):164904, 7 pages.
Kashyap, "Microwave Processing—A new dimension in synthesis of materials," Presented at Proceedings of the 2009 Applied Electromagnetics Conference, Kolkata, India, Dec. 14-16, 2009, 4 pages.
Kernion et al., "Giant induced magnetic anisotropy in strain annealed Co-based nanocomposite alloys", Appl. Phys. Letters, Sep. 6, 2012, 101(10):102408, 5 pages.
Kim et al., "Effects of induction annealing on the magnetic properties of amorphous alloys," Mater. Sci. Engineering, May 15, 1994, 181-182:973-977.
Kwon et al., "Temperature-and Frequency-Dependent Dielectric Properties of Sol-Gel-Derived BaTiO 3-NaNbO 3 Solid Solutions," J. Electron. Materials 45, Nov. 6, 2015, 45(1):631-638.
Leary et al., "Stress induced anisotropy in CoFeMn soft magnetic nanocomposites," J. Appl. Physics, May 6, 2015, 117(17):17A338, 4 pages.
Li et al., "Microwave Processing of Metallic Glass/polymer Composite Material in A Separated H-Field," in Advances in Induction and Microwave Heating of Mineral and Organic Materials, Grundas (ed.), Feb. 14, 2011, Chapter 11, 233-242.
Li et al., "Nanocrystallization of Fe73Si7B17Nb3 metallic glass induced by microwave treatment in magnetic field of a single mode 915 MHz applicator", J. Alloys Compounds, Sep. 25, 2012, 536(81):S315-S318.
Minić et al., "Stability and crystallization of Fe81B13Si4C2 amorphous alloy," J. Non-Cryst. Solids, Dec. 2009, 355(50-51):2503-2507.
Mirsaneh et al., "High dielectric tunability in lead niobate pyrochlore films," Appl. Phys. Letters, Feb. 21, 2012, 100(8):082901, 3 pages.
Mondal et al., "Microwave Sintering of Refractory Metals/alloys: W, Mo, Re, W—Cu, W—Ni—Cu and W—Ni—Fe Alloys," J. Microwave Power EE, 2010, 44(1):28-44.
Nicula et al., "Rapid nanocrystallization of soft-magnetic amorphous alloys using microwave induction heating," Scripta Materialia, Jan. 2009, 60(2):120-123.
Nicula et al., "Microwave energy absorption driven by dynamic structural and magnetization states in Fe85B15 metallic glass ribbons," Appl. Phys. Letters, Oct. 29, 2009, 95:174104, 3 pages.
Nicula et al., "Nanocrystallization of amorphous alloys using microwaves: in situ time-resolved synchrotron radiation studies," J. Phys. Conf. Series, 2009, 144:012109, 4 pages.
PCT International Preliminary Report on Patentability in International Appln. No. PCT/US2019/038023, dated Aug. 22, 2019, 6 pages.
PCT International Search Report and Written Opinion in International Appln. No. PCT/US2019/038023, dated Aug. 22, 2019, 8 pages.
Roy et al., "Definitive experimental evidence for Microwave Effects: radically new effects of separated E and H fields, such as decrystallization of oxides in seconds," Mater. Res. Innovations, Sep. 2002, 6(3):128-140.
Roy et al., "Full sintering of powdered-metal bodies in a microwave field," Nature, Jun. 17, 1999, 399:668-670.
Song et al., "Improved Energy Storage Properties Accompanied by Enhanced Interface Polarization in Annealed Microwave-Sintered BST," J. Am. Ceram. Society, Oct. 2015, 98(10):3212-3222.
Sun et al., "Review on Microwave-Matter Interaction Fundamentals and Efficient Microwave-Assisted Heating Strategies," Materials, Mar. 25, 2016, 9(4):231, 25 pages.
Vaucher et al., "Microwave-induced electromigration in multicomponent metallic alloys," Presented at Proceedings of the 2010 IEEE MTT-S International Microwave Symposium, Anaheim, CA, USA, May 23-28, 2010, 1440-1443.
Vaucher, "Dynamic High-Temperature Monitoring of Microwave Energy Absorption and Heating of Materials with Ultrafast In Situ Synchrotron X-Ray Tomographic Microscopy and Powder Diffraction Techniques," in Proceedings of the 2nd International Congress on 3D Materials Science, Annecy, France, Jun. 29-Jul. 2, 2014, 105-110.
Xu et al., "Structure and electrical properties of lead-free Bi 0.5 Na 0.5 TiO 3-based ceramics for energy-storage applications." RSC Advances, Jun. 2016, 6(64):59280-59291.

* cited by examiner

IN-LINE MICROWAVE PROCESSING OF ALLOYS

CROSS-REFERENCE TO RELATED APPLICATIONS

This application is a National Stage Application under 35 U.S.C. § 371 and claims the benefit of International Application No. PCT/US2019/038023, filed Jun. 19, 2019, which claims priority to U.S. Application Ser. No. 62/687,114, filed on Jun. 19, 2018. The disclosure of the prior application is considered part of the disclosure of this application, and is incorporated in its entirety into this application.

STATEMENT AS TO FEDERALLY SPONSORED RESEARCH

The invention was made with government support from the DOE EERE Solar Energy Technology Office, SuNLaMP program. The Government has certain rights in the invention.

TECHNICAL FIELD

This disclosure relates to processing materials in the presence of microwave energy.

BACKGROUND

Microwave energy can be used to process various kinds of materials. Microwaves can be transmitted, absorbed, or reflected, depending on the material type with which they interact. Microwave heating of materials is fundamentally different from conventional radiation-conduction-convection heating. In a microwave heating process, heat is generated internally within a material instead of originating from external heating sources.

SUMMARY

This disclosure describes technologies relating to processing materials, such as alloys and soft magnetic materials, in the presence of microwave energy.

Certain aspects of the subject matter described herein can be implemented as a method. A first region of a pure magnetic field is generated in a first processing zone using a microwave radiation source of the first processing zone. The first processing zone is a single mode microwave radiation chamber. A second region of a pure electric field is generated in the first processing zone using the microwave radiation source. The second region is spatially distinct from the first region. A first portion of an amorphous alloy is loaded automatically into the first processing zone. The first portion is positioned in an annealing region. The annealing region is a single field region selected from the first region and the second region. The first portion is heated in the annealing region. The first portion is automatically unloaded from the first processing zone.

This, and other aspects, can include one or more of the following optional features.

A magnitude of stress can be applied to the first portion while heating the first portion in the annealing region.

The first portion can be loaded automatically into a second processing zone selected from a single mode microwave radiation chamber, a multi-mode microwave radiation chamber, and a furnace. The first portion can be subjected to an annealing step in the second processing zone. The first portion can be automatically unloaded from the second processing zone.

A second portion of the alloy can be automatically loaded into the first processing zone. The second portion can be positioned in the annealing region. The second portion can be heated in the annealing region. The second portion can be automatically unloaded from the first processing zone.

After being heated in the annealing region, the second portion can exhibit magnetic properties selected from magnetic properties exhibited by the first portion after being heated in the annealing region and magnetic properties distinct from the magnetic properties exhibited by the first portion after being heated in the annealing region.

The first portion can be subjected to one or more processing steps selected from single mode microwave radiation annealing, multi-mode microwave radiation annealing, stress annealing, magnetic field annealing, thermal annealing, and combinations of these.

The alloy can be cut or wound into a tape wound core.

The first portion can have a length of less than approximately 25 centimeters (cm).

The first portion can have a length of less than approximately 15 cm.

The first portion can have a length of less than approximately 10 cm.

The first portion can have a length of less than approximately 8 cm.

The first portion can have a length of less than approximately 3 cm.

The first portion can have a length of less than approximately 1 cm.

The first portion can have a length of between approximately 0.5 cm and approximately 25 cm.

Heating the first portion in the annealing region can include heating the first portion to a temperature of between approximately 400° C. and approximately 700° C.

Heating the second portion in the annealing region can include heating the second portion to a temperature of between approximately 400° C. and approximately 700° C.

The alloy can include iron, copper, carbon, nickel, cobalt, boron, phosphorus, silicon, chromium, tantalum, niobium, vanadium, aluminum, molybdenum, manganese, tungsten, zirconium, zinc, or combinations of these.

The alloy can include cobalt, iron, manganese, niobium, silicon, and boron.

The alloy can include 80 atomic % or less of one or metals selected from cobalt, iron, and manganese. The alloy can include 20 atomic % of niobium, silicon, and boron.

The alloy can include 80 atomic % or less of one or more metals selected from cobalt, iron, and manganese. The alloy can include 4 atomic % of niobium. The alloy can include 2 atomic % of silicon. The alloy can include 14 atomic % of boron.

A thickness of the alloy can be measured.

A width of the alloy can be measured.

A permeability of the alloy can be measured.

A temperature of the alloy can be measured.

A magnetic property of the alloy can be measured.

Heating the first portion in the annealing region can be adjusted based on at least one of the measured thickness, the measured width, the measured permeability, the measured temperature, and the measured magnetic property.

The magnitude of stress applied to the first portion can be adjusted while heating the first portion in the annealing region.

The magnitude of stress applied to the first portion can be adjusted based on at least one of the measured thickness, the measured width, the measured permeability, and the measured temperature.

Certain aspects of the subject matter described herein can be implemented as a method. A first region of a pure magnetic field is generated in a first processing zone using a microwave radiation source of the first processing zone. The first processing zone is a single mode microwave radiation chamber. A second region of a pure electric field is generated in the first processing zone using the microwave radiation source. The second region is spatially distinct from the first region. A first portion of an amorphous alloy is automatically loaded into the first processing zone. While the first portion is loaded, a second portion of the amorphous alloy is automatically loaded into a second processing zone. The second processing zone is selected from a single mode microwave radiation chamber, a multi-mode microwave radiation chamber, a stress annealing system, a thermal annealing system, and combinations of these. The first portion is subjected to a first annealing step. The first annealing step includes positioning the first portion in an annealing region. The annealing region is a single field region selected from the first region and the second region. The first annealing step includes heating the first portion in the annealing region. While the first portion is subjected to the first annealing step, the second portion is subjected to a second annealing step. The first portion is automatically unloaded from the first processing zone. While the first portion is unloaded, the second portion is automatically unloaded from the second processing zone.

This, and other aspects, can include one or more of the following optional features.

Certain aspects of the subject matter described herein can be implemented as a single mode microwave radiation chamber. The single mode microwave radiation chamber includes a microwave radiation source configured to simultaneously generate a pure magnetic field and a pure electric field spatially distinct from the pure magnetic field. The single mode microwave radiation chamber includes a first tube defining a first region. The pure magnetic field generated by the microwave radiation source reaches a maximum magnetic field strength in the first region. The single mode microwave radiation chamber includes a second tube defining a second region. The pure electric field generated by the microwave radiation source reaches a maximum electric field strength in the second region.

This, and other aspects, can include one or more of the following optional features.

The single mode microwave radiation chamber can include a 90-degree elbow deflector configured to uniformly distribute at least one of the pure magnetic field and the pure electric field across a dimension of a material passing through the single mode microwave radiation chamber. The dimension can be transverse to a direction of the material passing through the single mode microwave radiation chamber.

Certain aspects of the subject matter described herein can be implemented as a system. The system includes a first microwave radiation zone. The microwave radiation zone is a single mode microwave radiation chamber. The system includes a material loading portion configured to load a material into the first microwave radiation zone. The system includes a controller in communication with the first microwave radiation zone and the material loading portion. The controller is configured to perform operations including transmitting signals to control the first microwave radiation zone and the material loading portion.

This, and other aspects, can include one or more of the following optional features.

The first microwave radiation zone can be a microwave radiation chamber according to any one of the previously described aspects.

The system can include a second microwave radiation zone.

The second microwave radiation zone can be selected from a single mode microwave radiation chamber and a multi-mode microwave radiation chamber.

The second microwave radiation zone can be a microwave radiation chamber according to any one of the previously described aspects.

The system can include one or more additional processing zones selected from a single mode microwave radiation chamber, a multi-mode microwave radiation chamber, a stress annealing system, a thermal annealing furnace, an external magnetic field, and combinations of these.

The material loading portion can be a de-spooler configured to unwind a tape wound core.

The system can include a material collecting portion configured to collect a material from the first microwave radiation zone.

The material collecting portion can be an up-spooler configured to wind a material to form a tape wound core.

The controller can include at least one hardware processor. The controller can include a computer-readable storage medium coupled to the at least one hardware processor. The computer-readable storage medium can store programming instructions for execution by the at least one hardware processor. The programming instructions, when executed, can cause the at least one hardware processor to perform operations. The operations can include transmitting a signal to adjust a speed at which the material loading portion loads material into the first microwave radiation zone. The operations can include transmitting a signal to adjust a speed at which the material collecting portion collects material from the first microwave radiation zone. The operations can include transmitting a signal to adjust a temperature within the first microwave radiation zone. The operations can include transmitting a signal to apply a magnitude of stress on a material positioned in the first microwave radiation zone. The operations can include recording information.

The systems and methods described herein provide one or more of the following advantages. First, the techniques described herein, which can include rapid thermal processing and cooling techniques, allow for enhanced and precise control of thermal profiles within the amorphous alloys. Second, the resolution of thermal processing can be spatially distributed, allowing for fine-scale tuning of properties and processing variability within a final fabricated core of amorphous alloy. Third, by applying high frequency electromagnetic fields (for example, 2.45 gigahertz), the electromagnetic radiation within the microwave radiation chamber can be fine-tuned, allowing for fine-tuning of microstructures and resulting physical properties of the final fabricated core of the initially amorphous alloy. Fourth, the spatially distinct magnetic and electric fields can allow for enhanced control over the thermal profile of the amorphous alloy, while the alloy is positioned within the microwave radiation chamber. Fifth, the spatial resolution of the annealing regions generated by microwave energy can allow for precise, localized heating of the amorphous alloys. Sixth, mechanical stress (such as tension) can be applied to the amorphous alloy while annealing the alloy with microwave energy, allowing for tuning of material properties, such as magnetic permeability, and achieving the creation of microscale and nanoscale structures within the alloys, thereby further improving magnetic and mechanical properties of such alloys.

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

For the terms "for example" and "such as," and grammatical equivalences thereof, the phrase "and without limitation" is understood to follow unless explicitly stated otherwise. As used herein, the term "about" is meant to account for variations due to experimental error. As used herein, the singular forms "a," "an," and "the" are used interchangeably and include plural referents unless the context clearly dictates otherwise.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

Figure 1:
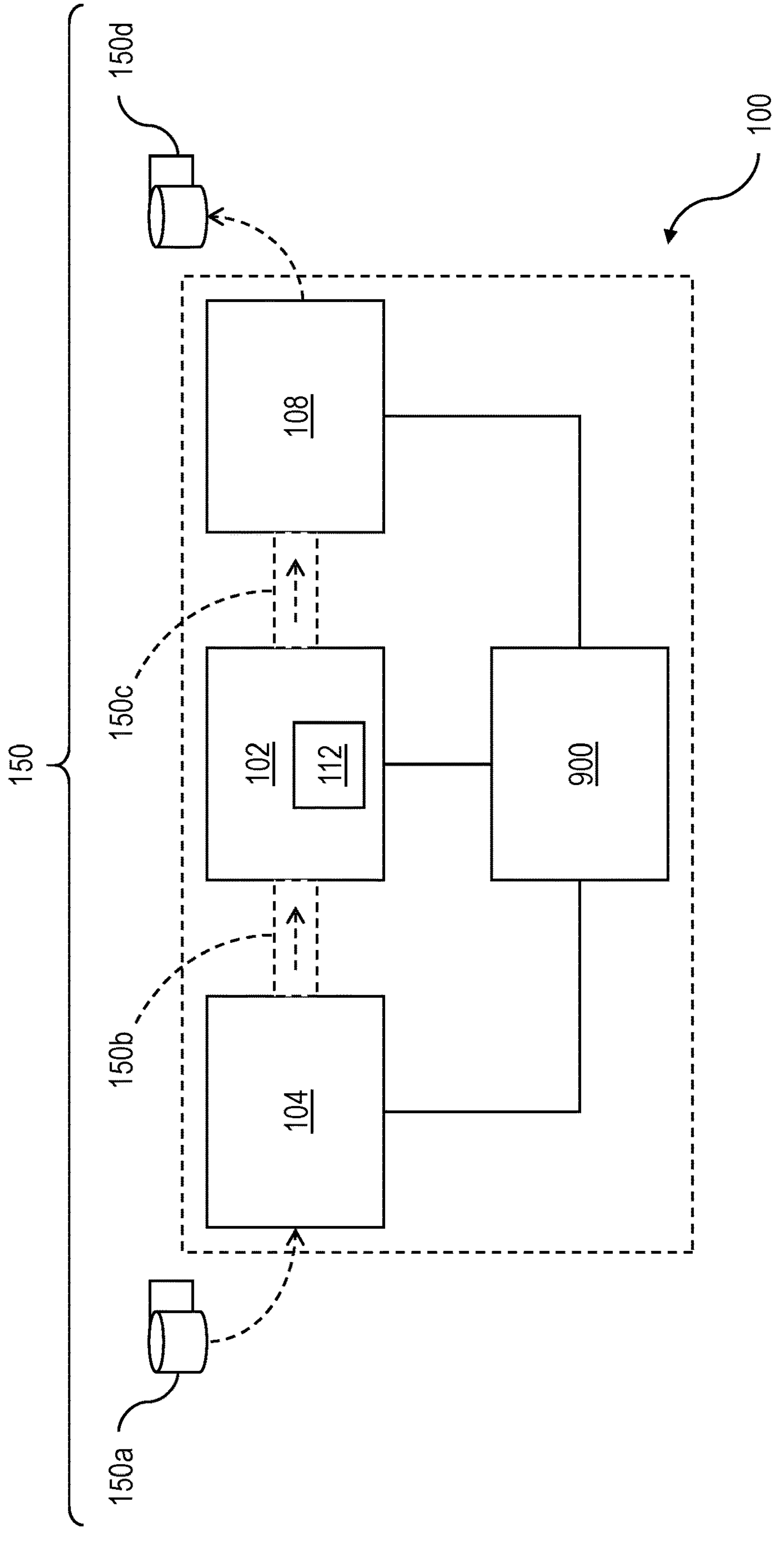
FIG. 1 is a block diagram of a system, according to an exemplary implementation.

Nanocrystalline and amorphous nanocomposite alloys are an emerging class of soft magnetic materials useful for a number of applications, such as electronics, transformers, and rotating electrical machinery. Nanocomposite alloys can have nanocrystalline grains that are smaller than 100 nanometers (nm) embedded within an amorphous matrix. In some implementations, such alloys can be produced by rapid solidification processing techniques to form metallic glass ribbons having thicknesses in a range of approximately 10 micrometers (μm) to approximately 20 μm, widths on the order of millimeters (mm) to centimeters (cm), and lengths on the order of meters (m) to kilometers (km). As used herein, "approximately" means a deviation or allowance of up to 10 percent (%) and any variation from a mentioned value is within the tolerance limits of any machinery used to manufacture the part. In some implementations, the amorphous alloys can be produced by planar flow casting. The synthesized ribbons can then be subjected to optimized annealing treatments to generate microstructures composed of nanocrystals embedded within an amorphous precursor. In some implementations, the synthesized ribbons can be subjected to processing, such as embrittlement, grinding, pressing, annealing, or any combination of these to produce metallic flakes and/or powder.

In some conventional manufacturing processes, the annealing treatment is typically performed after tape wound cores of the alloys have been formed to avoid processing difficulties stemming from the cores' brittle mechanical properties. Many nanocrystalline and amorphous alloys can become brittle during annealing treatments, which can make subsequent handling and further processing difficult. Furthermore, various advanced annealing treatments require extremely rapid heating processes and careful control of time and temperature, which can prove to be difficult for processing fully wound fabricated cores. For example, some annealing treatments require heating the alloy from room temperature (for example, 25° C.) to annealing temperature (for example, 560° C.) in only approximately 3.75 seconds, which translates to increasing the temperature at a rate of approximately 143° C. per second. For fully wound fabricated cores of amorphous alloy, such rapid heating rates can potentially cause the crystallization reaction (which is exothermic) to runaway (that is, continue to increase in temperature in an uncontrolled manner), making it difficult to attain desired material properties in a reproducible manner, particularly at a manufacturing level. The systems and methods described herein can be implemented to heat such materials at, in some implementations, slower and more controlled heating rates, thereby allowing for more precise control of crystallization of the material and simultaneously mitigating the risk of a runaway crystallization reaction resulting in a material with undesirable properties and microstructure.

In-line processes (for example, processes that are part of or occur during the production of the metallic glass ribbon or tape wound core), can be valuable in terms of material property optimization (such as increased flexibility) and enhanced control of localized properties throughout the core by time variation of mechanical, magnetic, or other applied fields impacting the ultimate material performance. However, traditional in-line annealing processes, such as by thermal conduction or convection, often require a large heating area (for example, areas spanning more than 15 cm of length along a material) in order to achieve acceptable time and temperature profiles. Such large areas can reduce the potential for spatially varying material properties (for example, varying material properties at scales of less than 15 cm, less than 5 cm, or less than 2 cm along a length of a material) and associated processing parameters by time-varying process fields, such as mechanical, magnetic, and electrical fields. The large area required by some in-line annealing processes can also reduce the maximum attainable production and processing rates. On the other hand, traditional furnaces sometimes require extensive time to anneal the amorphous alloy. As one example, the furnace heating process for preparing a wound core of amorphous alloy can include: increasing the temperature from room temperature to 470° C. at a rate of 5° C. per minute; maintaining the temperature at 470° C. for 1 hour; increasing the temperature from 470° C. to 543° C. at a rate of 0.8° C. per minute; maintaining the temperature at 543° C. for 3 hours; and then allowing the material to cool down to room temperature. The annealing process using a traditional furnace can sometimes take over 10 hours to complete. In contrast, the in-line processes described herein can, in some implementations, take less than 3 hours to process an equivalent full-scale fabricated core. The processes described herein can also be more energy efficient than traditional annealing processes. For example, the processes described herein avoid producing waste heat (typically associated with producing elevated temperatures in large furnaces) for full-scale fabricated cores.

Microwaves are electromagnetic radiation with wavelengths ranging from 1 millimeter to 1 meter in free space and frequencies ranging between approximately 100 megahertz to 300 gigahertz. Microwaves with a 2.45 gigahertz frequency are used almost universally for industrial and scientific applications. This disclosure describes in-line microwave processing, and more specifically, in-line microwave annealing of amorphous alloys to optimize material properties and fine tune localized properties, without requiring large areas of thermal contact. The microwave processing described herein includes separated radio frequency fields, such as a pure magnetic field and a pure electric field that are spatially distinct within a microwave radiation zone. In some implementations, the microwave radiation zone can be a single-mode microwave chamber, in which relative intensities of the pure magnetic and pure electric fields can be controlled, along with the spatial localization of the applied microwave fields. In this disclosure, a "microwave radiation chamber" is understood to mean any enclosure made of suitable electrically conductive material, in which the enclosure defines boundary conditions for generated microwave energy within the enclosure. The microwave energy can have single- or multi-mode characteristics. For example, a microwave radiation chamber can be a metal chamber such as a metal box.

FIG. 1 is a block diagram of an exemplary system 100 that can be used to anneal an amorphous alloy with microwave energy. The system 100 includes a microwave radiation zone 102, which can process a material 150 using microwave energy. The microwave radiation zone 102 can be a single mode microwave radiation chamber and include a microwave radiation source 112. The microwave radiation zone 102 is described in more detail later. System 100 includes a material loading portion 104, which can, in some implementations, unwind the material 150 and load the material 150 into the microwave radiation zone 102. The material 150 can be a ribbon made of an amorphous alloy. The system 100 includes a controller 900, which is in communication with the microwave radiation zone 102 and the material loading portion 104. The controller 900 can be configured to perform operations, such as transmitting signals to control the microwave radiation zone 102 and the material loading portion 104. The controller 900 is described in more detail later. In some implementations, the system 100 can be a standalone system. In some implementations, the system 100 can replace or supplement another system.

The material 150 can be a ribbon of amorphous alloy including, for example, iron, copper, carbon, nickel, cobalt, boron, phosphorus, silicon, chromium, tantalum, niobium, vanadium, aluminum, molybdenum, manganese, tungsten, zirconium, zinc, or any combination of these. In some implementations, the material 150 can be a ribbon of a cobalt-based alloy. The alloy can, for example, include cobalt (Co), iron (Fe), manganese (Mn), niobium (Nb), silicon (Si), and boron (B). In some implementations, the material 150 includes an alloy with the following composition: 80 atomic % or less of Co, Fe, and Mn; and 20 atomic % of Nb, Si, and B. In some implementations, the material 150 includes an alloy with the following composition: 80 atomic % or less of Co, Fe, and Mn; 4 atomic % of Nb; 2 atomic % of Si; and 14 atomic % B. For example, the material 150 can have a composition of Co(80-x-y)-Fe(x)-Mn(y)-Nb(4)-Si(2)-B(14), where the values in parentheses following any given atom is provided in atomic %. In some implementations, x (atomic % of Fe) is equal toy (atomic % of Mn). In some implementations, x (atomic % of Fe) is greater than y (atomic % of Mn). In some implementations, x (atomic % of Fe) is less than y (atomic % of Mn). In some implementations, x+y (combined atomic % of Fe and Mn) is equal to the atomic % of Co in the material 150. In some implementations, x+y (combined atomic % of Fe and Mn) is greater than the atomic % of Co in the material 150. In some implementations, x+y (combined atomic % of Fe and Mn) is less than the atomic % of Co in the material 150.

The material 150 can undergo changes while in the system 100, and the letter designations (for example, **150*a*, 150*b*, 150*c*, and 150*d*) signify the material 150 at various stages as the material 150 passes through the system 100. The material 150*a* is the material before being fed to the system 100 and can be, for example, a tape-wound core. The material 150*b* is the material after being unwound by the material loading portion 104, before being loaded into the microwave radiation zone 102. The material 150*c* is the material after being processed in the microwave radiation zone 102. The system 100 can include a material collecting portion 108, which can collect the material 150 from the microwave radiation zone 102 and wind the material 150 to form a tape-wound core. The material 150*d* is the material after being wound to form a tape-wound core. The material 150*d* can have a similar shape and configuration as the material 150*a*, but the material 150*d* has different material properties from the material 150*a* due to the processing that occurred in the system 100. In some implementations, after being processed in the microwave radiation zone 102, the material 150*c* (and material 150*d***) includes an embedded microstructure of nanocrystals.

Figure 2A:
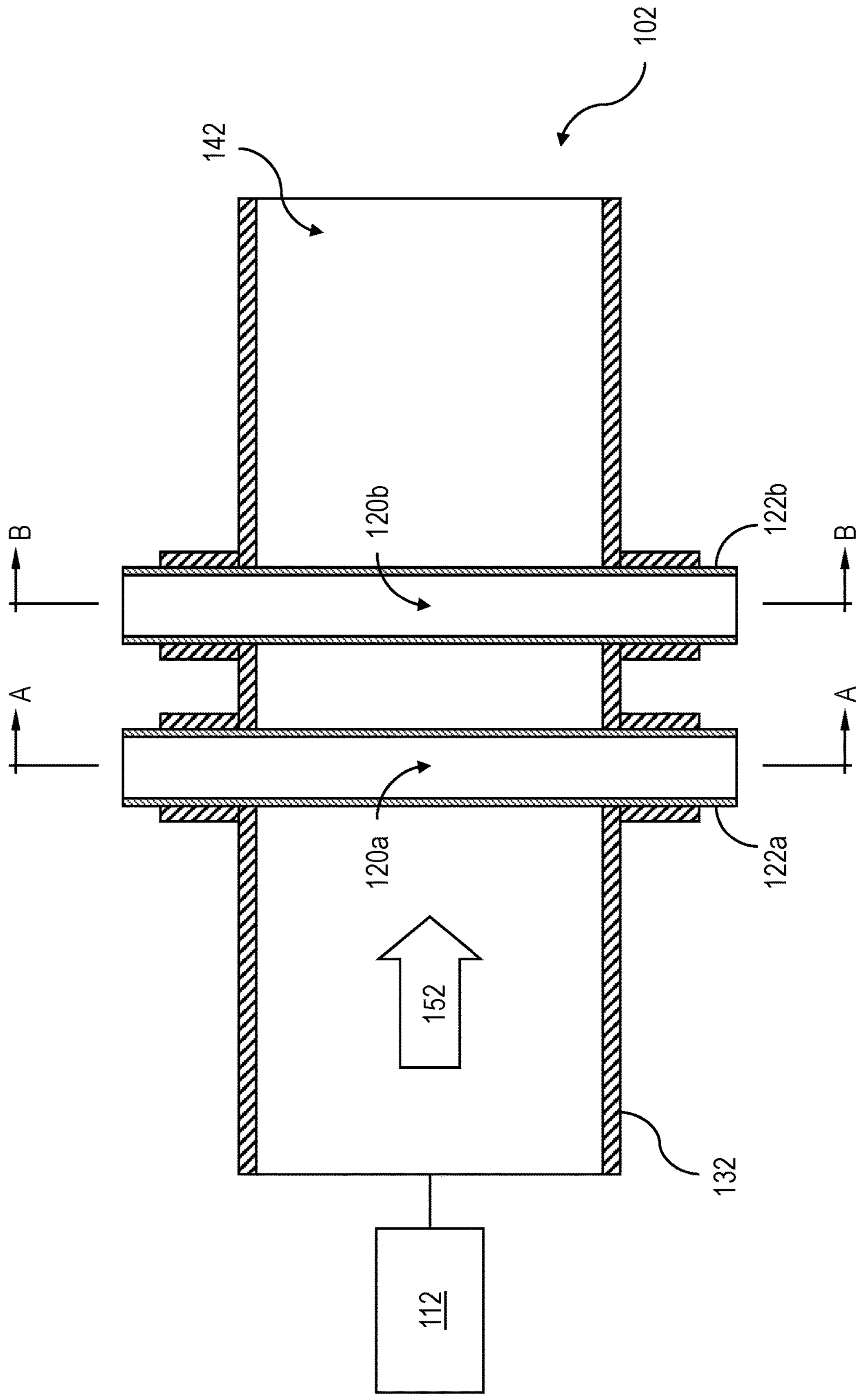
FIG. 2A is a cross-sectional view of a microwave radiation zone, according to an exemplary implementation.
Figure 2B:
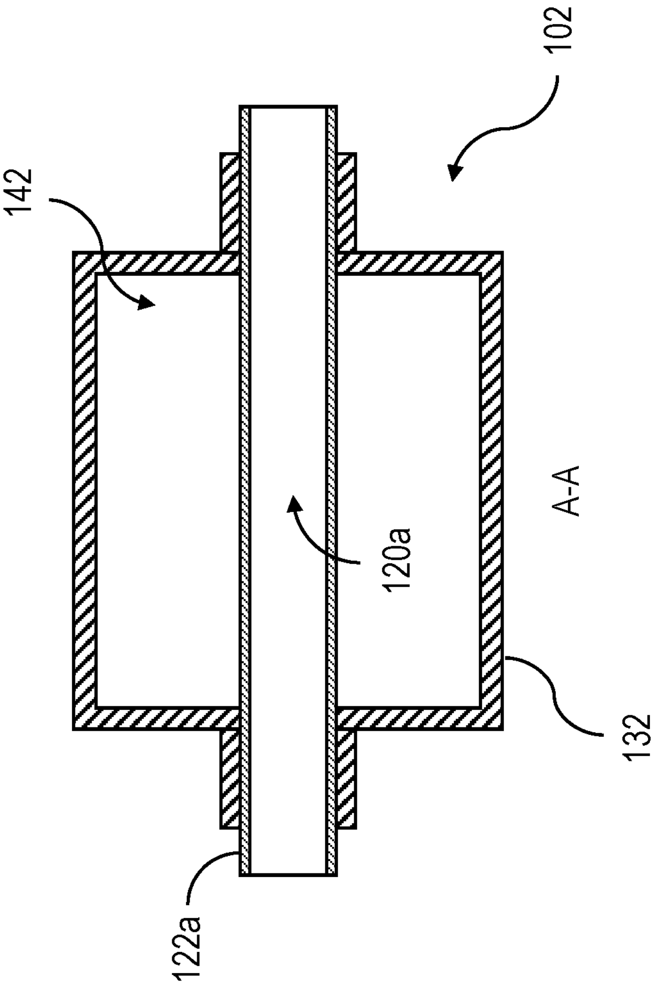
FIG. 2B is a view along the line A-A of FIG. 2A.
Figure 2C:
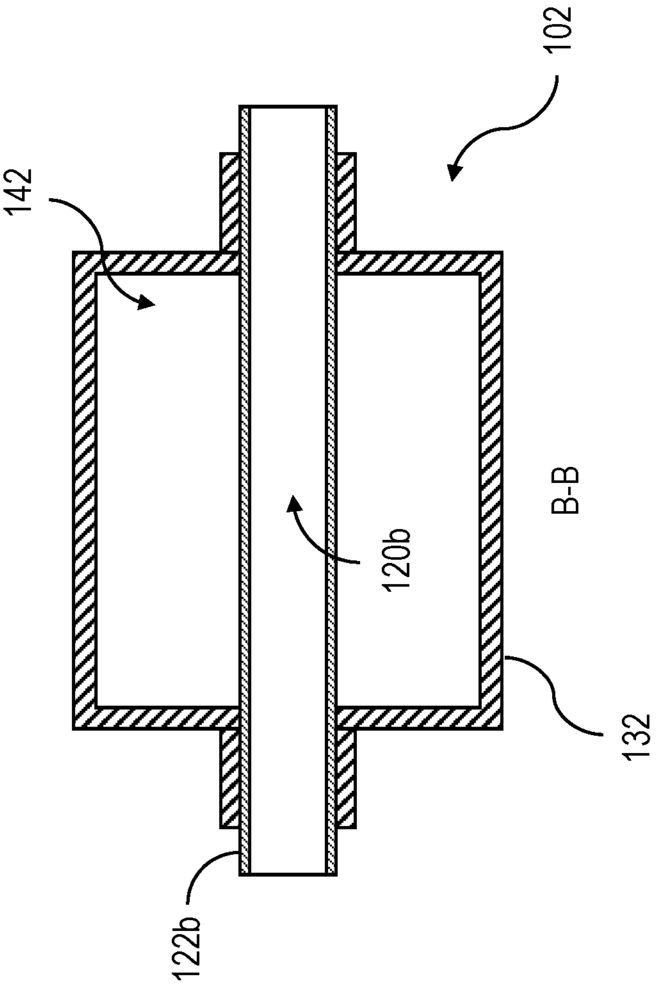
FIG. 2C is a view along the line B-B of FIG. 2A.

FIG. 2A illustrates an exemplary microwave radiation zone 102. FIG. 2B shows a view of the microwave radiation zone 102 along the line A-A of FIG. 2A. FIG. 2C shows a view of the microwave radiation zone 102 along the line B-B of FIG. 2A. In some implementations, the microwave radiation zone 102 includes an enclosure 132 defining a cavity 142. The enclosure 132 can have a rectangular cross-sectional shape. The microwave radiation source 112 can be separate from and coupled to the enclosure 132, as shown in FIG. 2A. The microwave radiation source 112 can optionally be integral to the enclosure 132, such that the microwave radiation source 112 and the enclosure 132 form a single body. Although not shown, the microwave radiation zone 102 can include additional components (separate from and coupled to or integral to the microwave radiation zone 102), such as a power supply, a generator head, a frequency tuner, an isolator, a microwave power monitor, a temperature monitor (such as a pyrometer), and one or more sensors (for example, for sensing or measuring a property of the material 150, such as a thickness, a width, a permeability, or a temperature of the material 150).

The microwave radiation source 112 can generate microwaves 152 in the cavity 142, and regions within the cavity 142 can have different magnetic and electric field strengths. For example, a first region 120*a* can be a region of a pure magnetic field, and a second region 120*b* can be a region of a pure electric field. In the pure magnetic field of the first region 120*a*, the magnetic field generated by the microwaves 152 reaches a maximum magnetic field strength. Conversely, in the pure magnetic field of the first region 120*a*, the electric field generated by the microwaves 152 reaches a minimum electric field strength. In the pure electric field of the second region 120*b*, the electric field generated by the microwaves 152 reaches a maximum electric field strength. Conversely, in the pure electric field of the second region 120*b*, the magnetic field generated by the microwaves 152 reaches a minimum magnetic field strength. A material (such as the material 150) can be heated when exposed to the magnetic and/or electric fields generated by the microwaves. The material can therefore be heated within the microwave radiation zone 102 without the need for an active heat source (that is, a source that directly provides heat, such as a tube or box furnace).

As shown in FIG. 2A, the microwave radiation zone 102 can optionally include tubes 122*a* (first) and 122*b* (second) extending through the microwave radiation zone 102. The tubes 122*a* and 122*b* can be located in the first region 120*a* and the second region 120*b*, respectively. In some implementations, the microwave radiation zone 102 can be designed, such that the tubes 122*a* and 122*b* define the first region 120*a* and the second region 120*b*, respectively. The tubes 122*a* and 122*b* can be used to hold or guide a material (such as the material 150) to the first region 120*a* and the second region 120*b*, respectively, based on the desired field. The tubes 122*a* and 122*b* can be made of material that is transparent to microwave energy, such as quartz. The first region 120*a* (magnetic field maximum region) and the second region 120*b* (electric field maximum region) are spatially distinct. For example, the first region 120*a* and the second region 120*b* are separated by approximately 6 cm. In some implementations, the microwave radiation zone 102 can be provided in a different configuration, such that the maximum magnetic field and the maximum electric field are rotated (for example, by 90 degrees) with respect to each other, as well as with respect to an orientation of the material 150 (such as the orientation—for example, vertical or horizontal—of the ribbon of amorphous alloy). In some implementations, the microwave radiation zone 102 includes an elbow deflector configured to redirect the microwave energy, such that the maximum magnetic field and the maximum electric field are rotated with respect to each other. For example, the microwave radiation zone 102 can include a 90-degree elbow deflector configured to redirect the microwave energy, such that the maximum magnetic field and the maximum electric field are rotated by 90-degrees with respect to each other, as well as with respect to an orientation of the material 150. In some implementations, the 90-degree elbow deflector can be configured to uniformly distribute at least one of the pure magnetic field and the pure electric field across a dimension (for example, a width) of the material 150 passing through the microwave radiation zone 102. For example, the 90-degree elbow deflector can uniformly distribute the microwave energy across the width of the material 150 transverse to the direction in which the material 150 is passing through the zone 102.

Figure 3A:
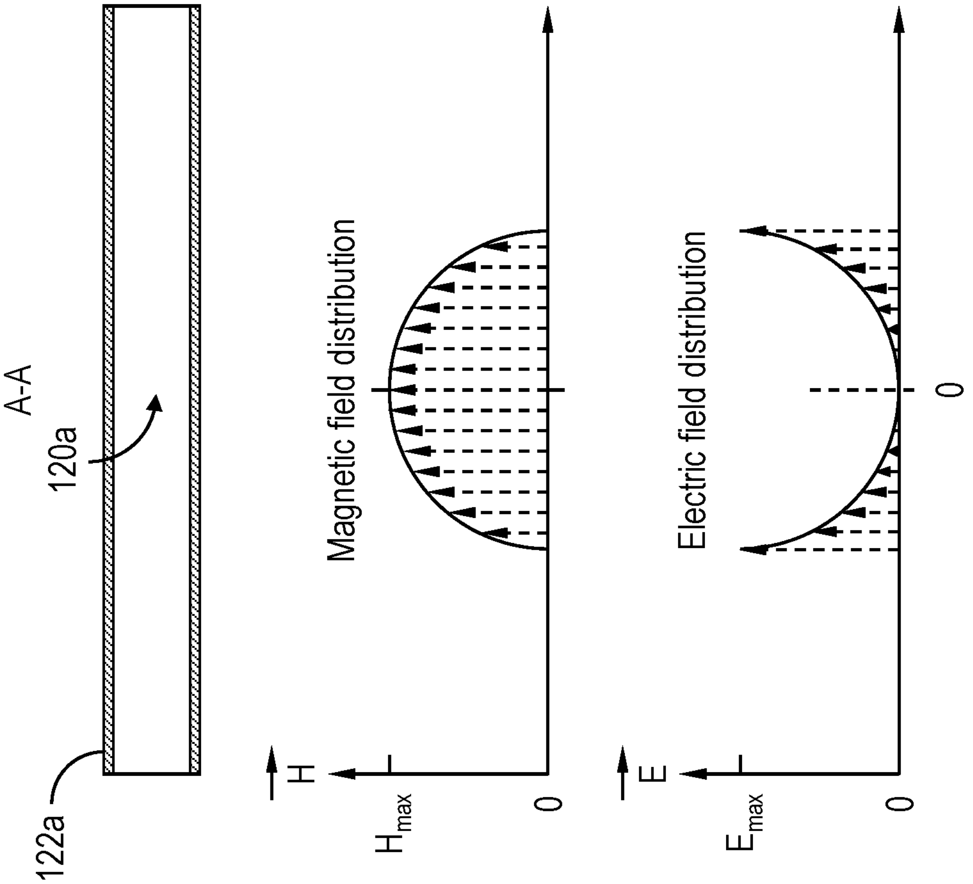
FIG. 3A illustrates an example of the microwave field distribution within a portion of the microwave radiation zone of FIG. 2A.
Figure 3B:
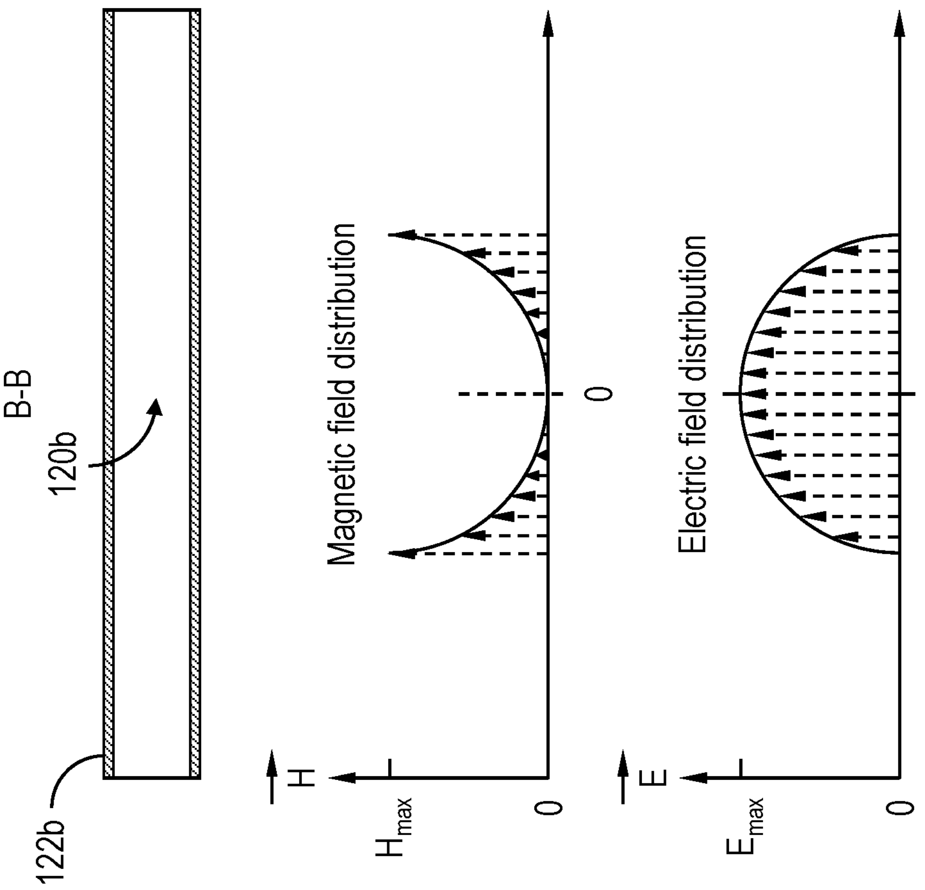
FIG. 3B illustrates an example of the microwave field distribution within a portion of the microwave radiation zone of FIG. 2A.

FIGS. 3A and 3B provide exemplary magnetic field and electric field distributions along the lines A-A and B-B, respectively. In the first region 120*a*, the maximum magnetic field occurs where the electric field is at a minimum. In the second region 120*b*, the maximum electric field occurs where the magnetic field is at a minimum. It is noted that depending on the size of the material 150, it is possible that the entire material may not be positioned at the absolute maximum of the magnetic field or electric field. For example, if the maximum magnetic field or the maximum electric field is located at the center point of the cavity 142, then a portion of the sample can be positioned exactly at the center point, and another portion of the sample can be positioned slightly adjacent to the center point. As such, the portion that is positioned slightly adjacent may not be exposed to the maximum magnetic field or the maximum electric field. As a result, when the material is described herein as being positioned at a "maximum" field region, a "minimum" field region, or a "pure" field region, it is understood that a portion of the material can be positioned slightly adjacent to the maximum field point, minimum field point, or pure field point.

Figure 4A:
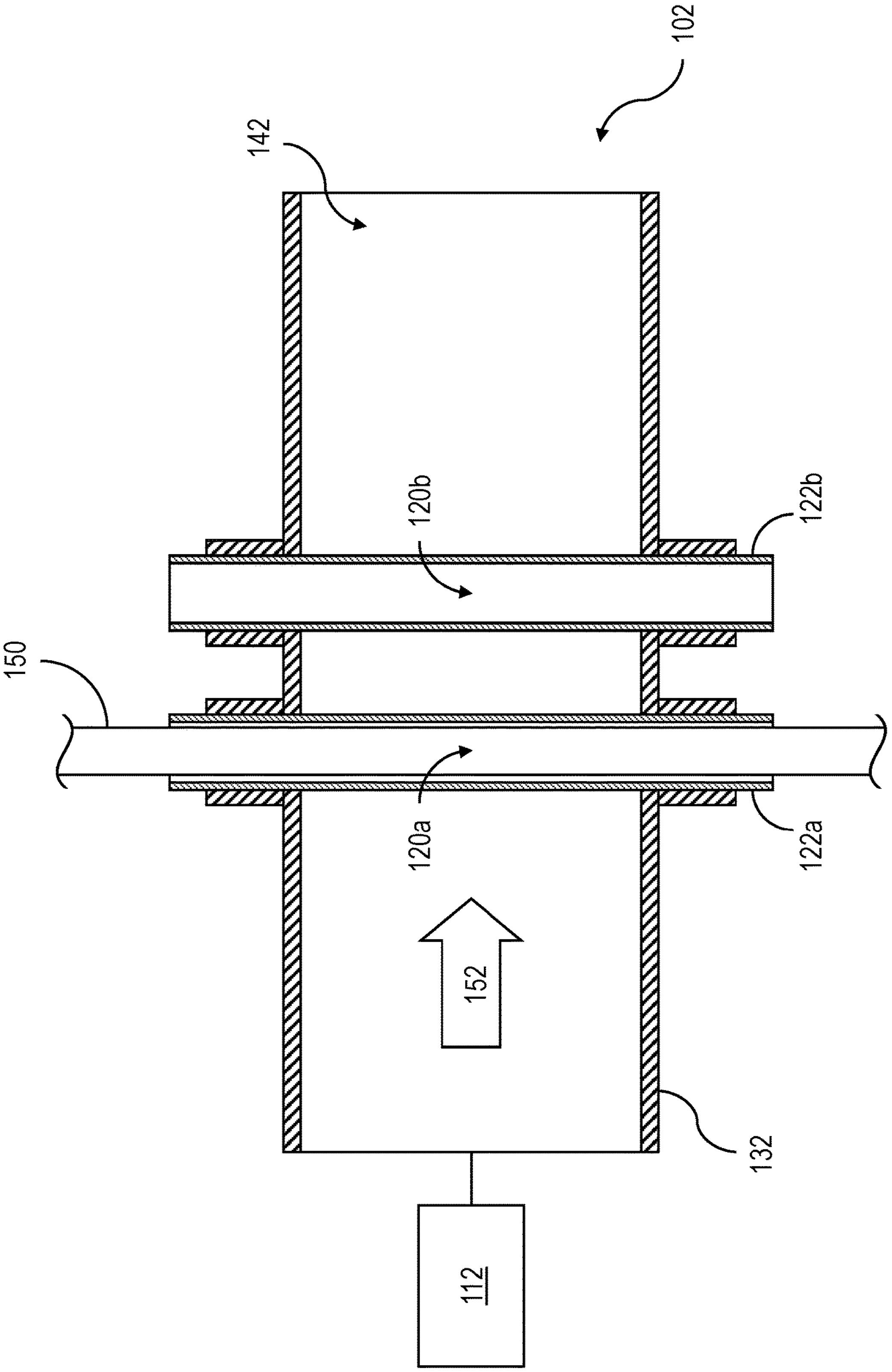
FIGS. 4A & 4B are views of the microwave radiation zone of FIG. 2A including a ribbon of amorphous alloy.
Figure 4B:
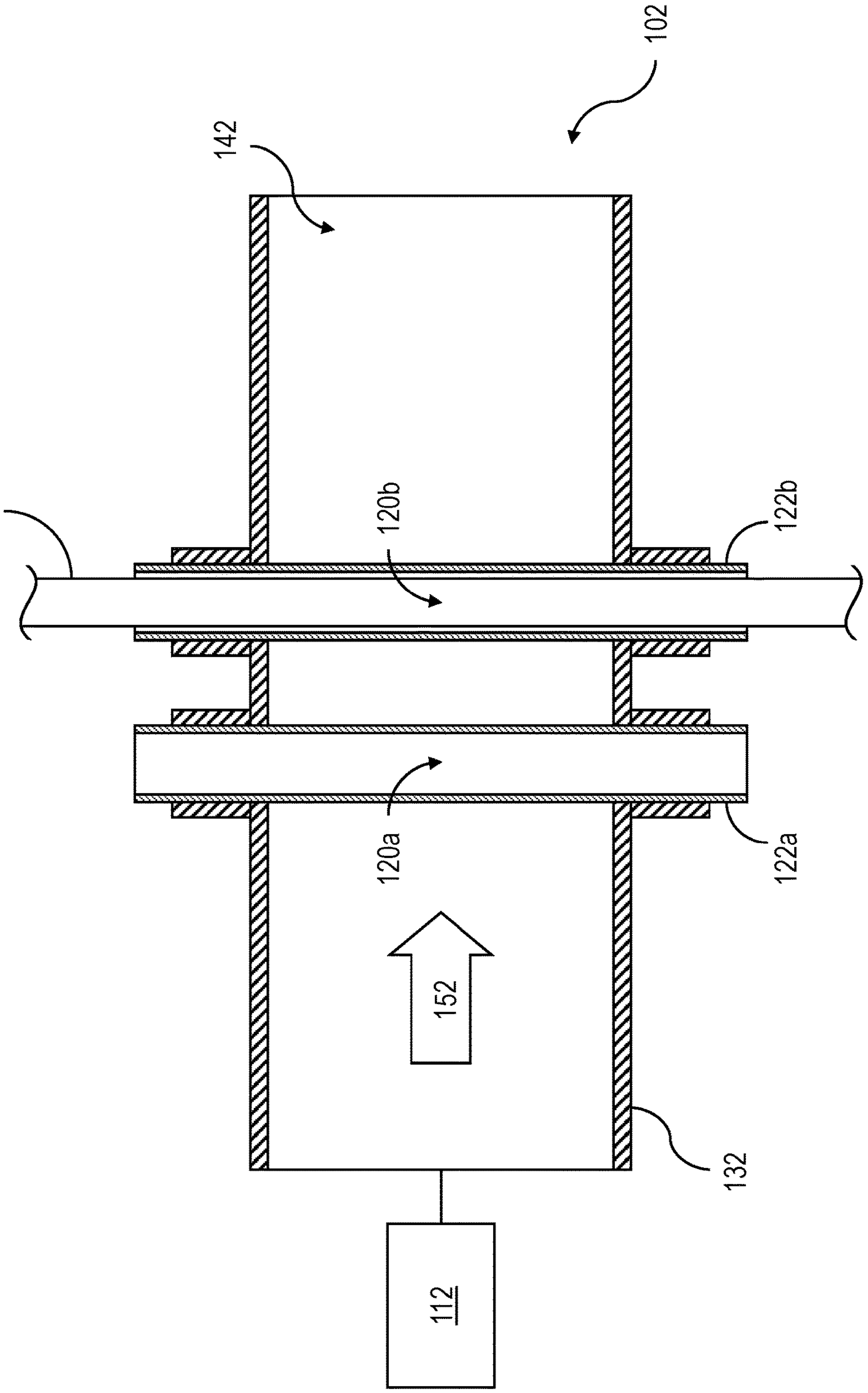

FIGS. 4A and 4B illustrate examples of the microwave radiation zone 102 with a material (150) passing through the microwave radiation zone 102. In FIG. 4A, the material 150 can be guided by or otherwise supported by the tube 122*a* to pass through the first region 120*a* of the pure magnetic field. In FIG. 4B, the material 150 can be guided by or otherwise supported by the tube 122*b* to pass through the second region 120*b* of the pure electric field. Although shown in FIGS. 4A and 4B as being in a horizontal position, the material 150 can be in another orientation, for example, at an angle or in a vertical position, as the material 150 passes through the microwave radiation zone 102. In some implementations, the material 150 can be passed through the microwave radiation zone 102 at a constant or variable rate. In some implementations, the material 150 can be held in position relative to the microwave radiation zone 102 for a duration of time sufficient to allow annealing to occur before being moved.

Implementations can find application in a variety of material processing applications, such as producing soft magnetic metal ribbons. For example, for certain types of electronic devices, it may be desirable to heat only a portion of the device. By properly positioning a device, a particular portion can be subjected to the maximum magnetic field region (120*a*) or the maximum electric field region (120*b*) in order to heat up the particular portion. In one non-limiting example of an application, a metal deposited can be heated on a ceramic substrate. By subjecting the metal to the magnetic field region, it can be possible to heat the metal while the ceramic is not heated, due to the different interactions of the metal and the ceramic with the magnetic field. Such processes can be suitable, for example, for activating catalysts, processing semiconductor devices, and forming coatings, where different materials can be heated differently depending on their interactions with the magnetic field or electric field generated by a microwave processing system (for example, the system 100). Numerous materials can be processed according to implementations of the present subject matter, including, but not limited to, metals, ceramics, semiconductors, superconductors, polymers, composites, and glasses. The term "metals" includes not only pure metals, but also other materials having metallic and soft magnetic properties, such as alloys, which can be easily magnetized and de-magnetized.

In semiconductor processing, it is sometimes necessary to heat a particular layer in order to, for example, activate a dopant, anneal a metal, or cause reflow of an electrode. Microwave processing by exposing the necessary region to a separate, essentially pure magnetic field or electric field enables one region to be heated while other regions, which can be heat-sensitive, are kept at a cooler temperature. A material (for example, the material 150) can be moved through the regions of maximum magnetic field and/or maximum electric field as desired. Such microwave processing systems can be a standalone processing system or attached to a larger processing system having other processing zones, such as a semiconductor processing cluster zone.

Figure 5:
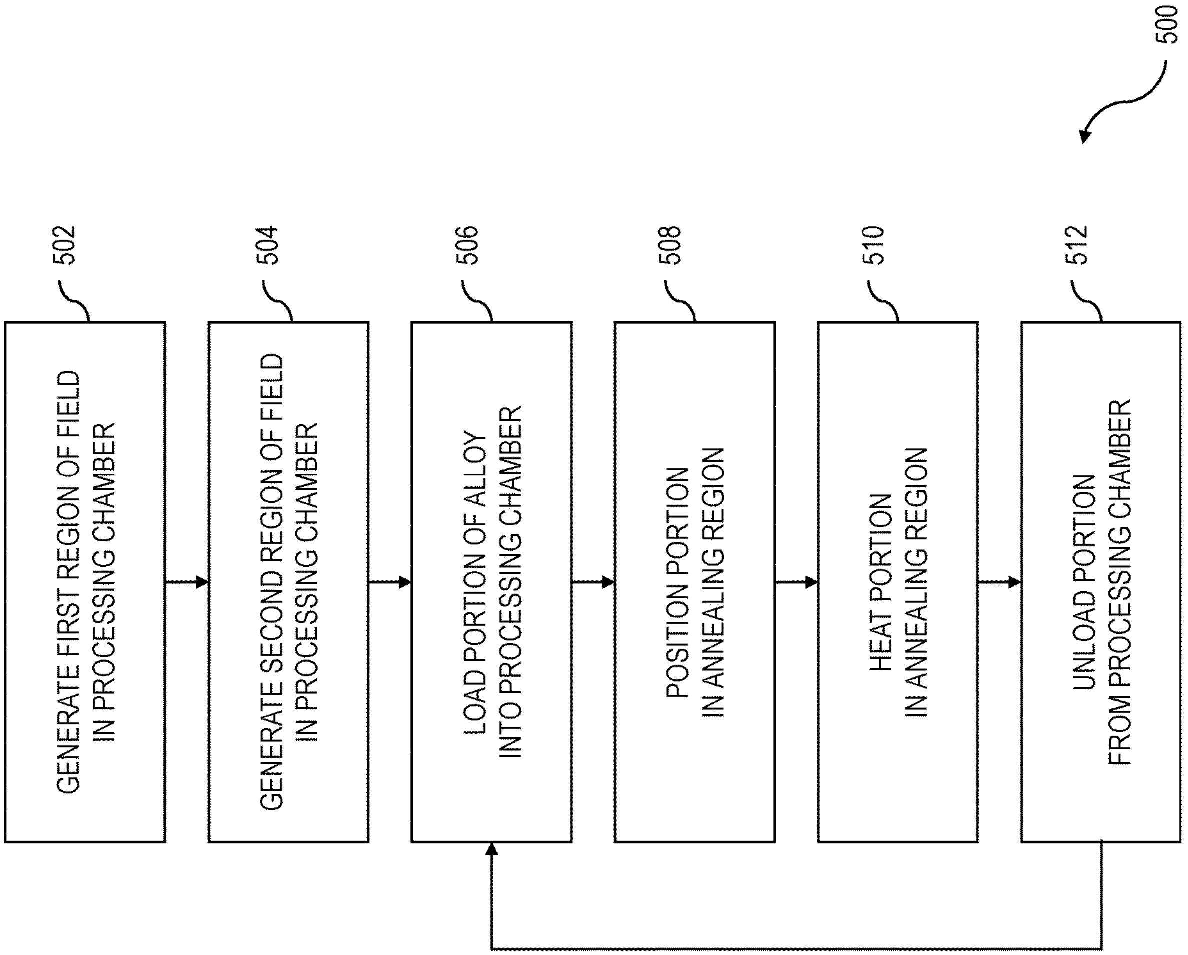
FIG. 5 is a flow chart of a method, according to an exemplary implementation.

FIG. 5 is a flow chart for an exemplary method 500 for processing a material, such as the material 150, using microwave energy. At stage 502, a first region of a pure magnetic field (such as the first region 120*a*) can be generated in a processing zone (first processing zone) with a microwave radiation source. The first processing zone can be a single mode microwave radiation chamber (such as the microwave radiation zone 102) including a microwave radiation source (such as the microwave radiation source 112). At stage 504, a second region of a pure electric field (such as the second region 120*b*) can be generated in the first processing zone (102) with the microwave radiation source (112). The second region (120*b*) generated at stage 504 can be spatially distinct from the first region (120*a*) generated at stage 502.

At stage 506, a portion (e.g., first portion, second portion, third portion, or other portion) of an amorphous alloy (such as the material 150) can be loaded automatically into the first processing zone (102). The portion (e.g., first portion, second portion, third portion, or other portion) can have a length of between approximately 0.5 cm and approximately 25 cm, or smaller. For example, the first portion has a length of less than approximately 25 cm, less than approximately 15 cm, less than approximately 10 cm, less than approximately 8 cm, less than approximately 3 cm, or less than approximately 1 cm. In some implementations, the first portion has a length of, e.g., approximately 0.1 cm, 0.2 cm, 0.3 cm, 0.4 cm, 0.5 cm, 0.6 cm, 0.7 cm, 1 cm, 2 cm, 3, cm, 4 cm, 5 cm, 7 cm, 10 cm, 12 cm, or 15 cm, between about 0.1 cm and about 1 cm, between about 0.1 cm and about 0.8 cm, between about 0.2 cm and about 0.7 cm, between about 0.3 cm and about 0.6 cm, between about 0.4 cm and about 0.6 cm, between about 0.4 cm and about 5 cm, between about 0.5 cm and about 5 cm, between about 0.6 cm and about 3 cm, between about 0.8 cm and about 2 cm, between about 0.5 cm and about 1 cm, between about 1 cm and about 3 cm, between about 2 cm and about 8 cm, between about 3 cm and about 6 cm, between about 7 cm and about 15 cm, between about 10 cm and about 15 cm, between about 0.1 cm and about 10 cm, between about 0.1 cm and about 15 cm, between about 5 cm and about 15 cm, between about 5 cm and about 10 cm, between about 1 cm and about 5 cm, or between about 0.5 cm and about 15 cm. In some implementations, the first portion has a length of between approximately 0.5 cm and approximately 10 cm. In some implementations, the first portion has a length of between approximately 0.5 cm and approximately 8 cm. In some implementations, the first portion has a length of between 0.5 cm and approximately 3 cm. The length of the first portion can correspond to the spatial heating resolution of the microwave radiation zone. For example, the length of the first portion can correspond to the first region 120*a* of the pure magnetic field, where the magnitude of the magnetic field reaches a maximum. For example, the length of the first portion can correspond to the second region 120*b* of the pure electric field, where the magnitude of the electric field reaches a maximum.

At stage 508, the first portion can be positioned in an annealing region. The annealing region can be a single field region which can be selected from the first region (120*a*) and the second region (120*b*). At stage 510, the first portion can be heated in the annealing region. The first portion can be heated in the annealing region to a temperature of between approximately 400° C. and approximately 700° C. Heating the amorphous alloy (150) can, in some implementations, alter the physical and chemical properties of the amorphous alloy (150). The heating of the amorphous alloy (150) within the first processing zone (102) can be localized to a portion of the amorphous alloy (150) that can be positioned within the annealing region. For in-line processes, because the amorphous alloy (150) is moving through the processing zone, the first portion will likely spend less time within the processing zone in comparison to annealing within a furnace. Accordingly, the set point in controlling the temperature of the material can, in some implementations, be hotter than the target temperature. For example, for a target temperature of 515° C., the set point temperature can be 560° C.

In some implementations, a magnitude of stress can be applied to the first portion while the first portion is heated in the annealing region. For example, a tension strain can be applied on the amorphous alloy (150) while the first portion is heated in the annealing region. For example, the first portion can be heated in the annealing region and subjected to a magnitude of stress simultaneously. The stress can be applied, for example, by pulling the amorphous alloy (150) or by spreading the amorphous alloy (150). In some implementations, the application of stress can be constant or applied temporarily and released. In some implementations, the amount of stress applied can be constant or variable as a function of time while the amorphous alloy (150) is heated within the first processing zone (102). For example, the amount of stress applied while heating can vary in a linear manner (for example, increasing at a substantially constant rate). As another example, the amount of stress applied while heating can vary in a cyclical manner (for example, as a periodic linear ramp or sinusoidal ramp of tension with time). Applying stress to the amorphous alloy (150) while heating can further alter the physical properties of the amorphous alloy (150). For example, applying tension while heating can alter a permeability (for example, a magnetic permeability) of the amorphous alloy (150). The tensile stress can impart magnetic anisotropy to the amorphous alloy (150), thereby affecting the magnetic permeability of the amorphous alloy (150). Both high (for example, greater than approximately 10,000) and low (for example, less than approximately 10) relative magnetic permeabilities (relative to vacuum permeability) can be advantageous depending on the application (see, e.g., "Metal Amorphous Nanocomposite (MANC) Alloy Cores with Spatially Tuned Permeability for Advanced Power Magnetic Applications" by Byerly et al., June 2018). In some implementations, the local permeabilities of different sections of the amorphous alloy (150) can be different, depending on the time, temperature, and stress applied to the sections while the amorphous alloy (150) passes through the processing zone (102). In some implementations, the relative magnetic permeability can range between 10 to 10,000 across the amorphous alloy (150). For example, the local permeability of a portion of the amorphous alloy (150) can be 100 while the local permeability of another portion of the same amorphous alloy (150) can be 1,000.

One or more properties of the amorphous alloy can be measured during the processing of the amorphous alloy, for example, using one or more sensors included in the microwave radiation zone 102. The processing can be adjusted based on the measurements taken. For example, the processing can include a passive or active feedback loop, in which parameters can be adjusted in response to the measured properties. In some implementations, a thickness of the amorphous alloy (for example, a thickness of a metal ribbon) can be measured. In some implementations, a width of the amorphous alloy (for example, a width of a metal ribbon) can be measured. In some implementations, a permeability of the amorphous alloy (for example, a magnetic permeability of a metal ribbon) can be measured. In some implementations, a temperature of the amorphous alloy (for example, a temperature of a portion of a metal ribbon positioned within the microwave radiation zone 102) can be measured. In some implementations, a temperature within the microwave radiation zone 102 can be measured using a pyrometer. Heating the first portion in the annealing region at stage 508 can be adjusted (for example, by adjusting the microwaves generating the magnetic and electric fields) based on the measured thickness, the measured width, the measured permeability, the measured temperature, or any combination of these. In some implementations, the magnitude of stress applied to the amorphous alloy can be adjusted based on the measured thickness, the measured width, the measured permeability, the measured temperature, or any combination of these. In some implementations, the microwave energy generated by the microwave radiation source 112 can be adjusted based on the measured thickness, the measured width, the measured permeability, the measured temperature, or any combination of these.

At stage 512, the first portion can be unloaded from the first processing zone (102). In some embodiments, after unloading the first portion from the first processing zone in stage 512, the steps of 506, 508, 510, and 512 can optionally be repeated for the same portion or a different portion of the amorphous allow (150). In some embodiments, after unloading the first portion from the first processing zone (102), the first portion can optionally be loaded automatically into a second processing zone. Non-limiting examples of the additional processing zones (e.g., second processing zone) that can be used herein include a single mode microwave radiation chamber (similar to or the same as the first processing zone 102), a multi-mode microwave radiation chamber, applied stress, applied external magnetic field, thermal annealing oven, or any combination of these. The first portion can be subjected to an annealing step in the second processing zone. In some implementations, the annealing step in the second processing zone can be the same as the stages (e.g., 506, 508, 510, 512) that occur in the first processing zone (102). In some implementations, the first portion can be subjected to one or more additional processing steps, such as single mode microwave radiation annealing (similar to or the same as the steps occurring in the first processing zone 102), multi-mode microwave radiation annealing, stress annealing (such as tension annealing), thermal annealing, or any combination of these. The first portion can then be automatically unloaded from the second processing zone.

In some implementations, the first portion can be reloaded into the first processing zone (102) and positioned in an annealing region different from the previous annealing region to heat the first portion. For example, if the annealing region at stage 508 was selected as the first region 120*a* of the pure magnetic field, the first portion can subsequently be reloaded into the first processing zone (102) and positioned in an annealing region selected as the second region 120*b* of the pure electric field. For example, if the annealing region at stage 508 was selected as the second region 120*b* of the pure electric field, the first portion can subsequently be reloaded into the first processing zone (102) and positioned in an annealing region selected as the first region 120*a* of the pure magnetic field.

The method 500 can be performed as an in-line process. Therefore, in some embodiments, after the first portion is unloaded from the first processing zone (102) at stage 512, a second portion of the amorphous alloy (150) can undergo the same steps of method 500 as the first portion (that is, the second portion can undergo stages 506, 508, 510, and 512). In some implementations, after being heated in the annealing region 510, the second portion can exhibit magnetic properties that are the same as magnetic properties exhibited by the first portion after the first portion is heated in the annealing region at stage 510. In some implementations, after being heated in the annealing region (stage 510), the second portion can exhibit magnetic properties that are distinct from magnetic properties exhibited by the first portion after the first portion is heated in the annealing region at stage 510. The method 500 can, in some implementations, be performed on remaining portions of the amorphous alloy (150). As one example, in the case of a metal ribbon, the entirety of the metal ribbon can be processed according to the method 500 (or alternatively, a single portion or multiple portions of the metal ribbon). In some implementations, the entire length of the metal ribbon can be on the order of cm, m, or km (for example, 20 cm, 1 m, 100 m, or 1 km) (e.g., a continuous metal ribbon). The parameters of the in-line process can be adjusted throughout the inline processing of a continuous metal ribbon (e.g., through repeating method 500 for different portions of the ribbon), such that material properties vary along the length of the amorphous alloy (150) after completing the multiple repetitions of method 500 across multiple portions of the alloy. For example, parameters such as the strength of the microwave energy, the amount of applied tension on the amorphous alloy (150), the speed of the passage of the metal ribbon through the inline process, or other parameters can be independently adjusted as the amorphous alloy (150) is processed.

In some implementations, the amorphous alloy (150) can be processed to form a tape wound core (e.g., a continuous metal ribbon). For example, a tape core of an amorphous alloy can be wound, and then after impregnation (that is, porosity sealing), the core can be cut, depending on the desired magnetic properties (such as magnetic permeability) of the final processed metal ribbon. In cases where the parameters of the first processing zone (102) were adjusted during the in-line processing of the amorphous alloy (150), the manner in which the core is cut and/or wound can depend on the desired spatial distribution of the desired properties, for example, across circumferential regions of the final tape wound core. As one example, for periodic manipulation of parameters of the first processing zone (102), such as strength of the generated microwave energy, the tape core can be wound in a manner, such that regions of the material that have similar properties are located at a particular region along the circumference of the final tape wound core.

Figures 6A, 6B, 6C, 6D:
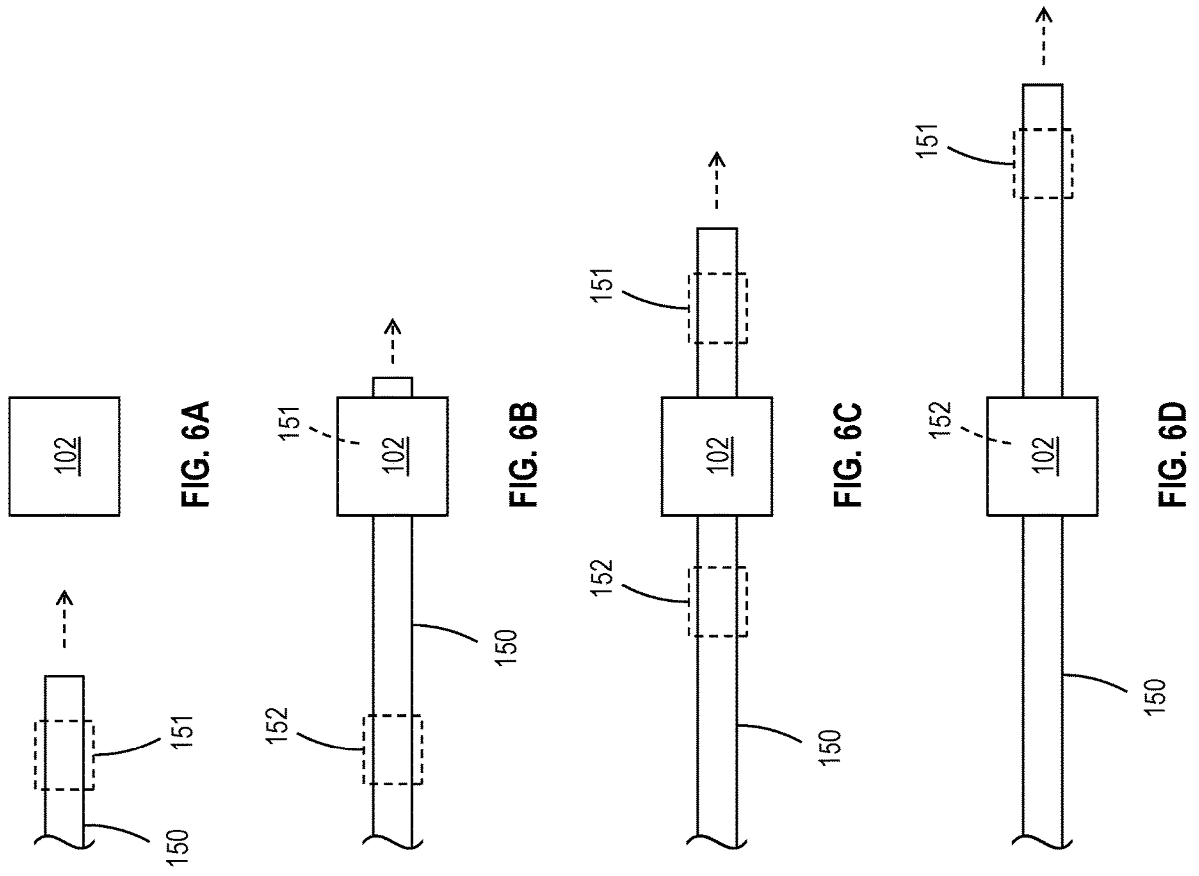
FIGS. 6A, 6B, 6C, and 6D are schematic diagrams illustrating an exemplary progression of the method of FIG. 5.

FIGS. 6A, 6B, 6C, and 6D are schematic diagrams illustrating an exemplary progression of an implementation of the method 500. FIG. 6A illustrates stage 506 (of method 500), in which a first portion 151 of the material 150 (for example, a ribbon of amorphous alloy) is loaded into a processing zone (such as the microwave radiation zone 102). FIG. 6B illustrates stage 508, in which the first portion 151 is positioned in the annealing region. FIG. 6C illustrates stage 506 for a second portion 152 of the material 150, in which the second portion 152 is loaded into the processing zone (102). FIG. 6C also illustrates stage 512 for the first portion 151, in which the first portion 151 is unloaded from the processing zone (102). FIG. 6D illustrates stage 508 for the second portion 152, in which the second portion 152 is positioned in the annealing region.

Figure 7:
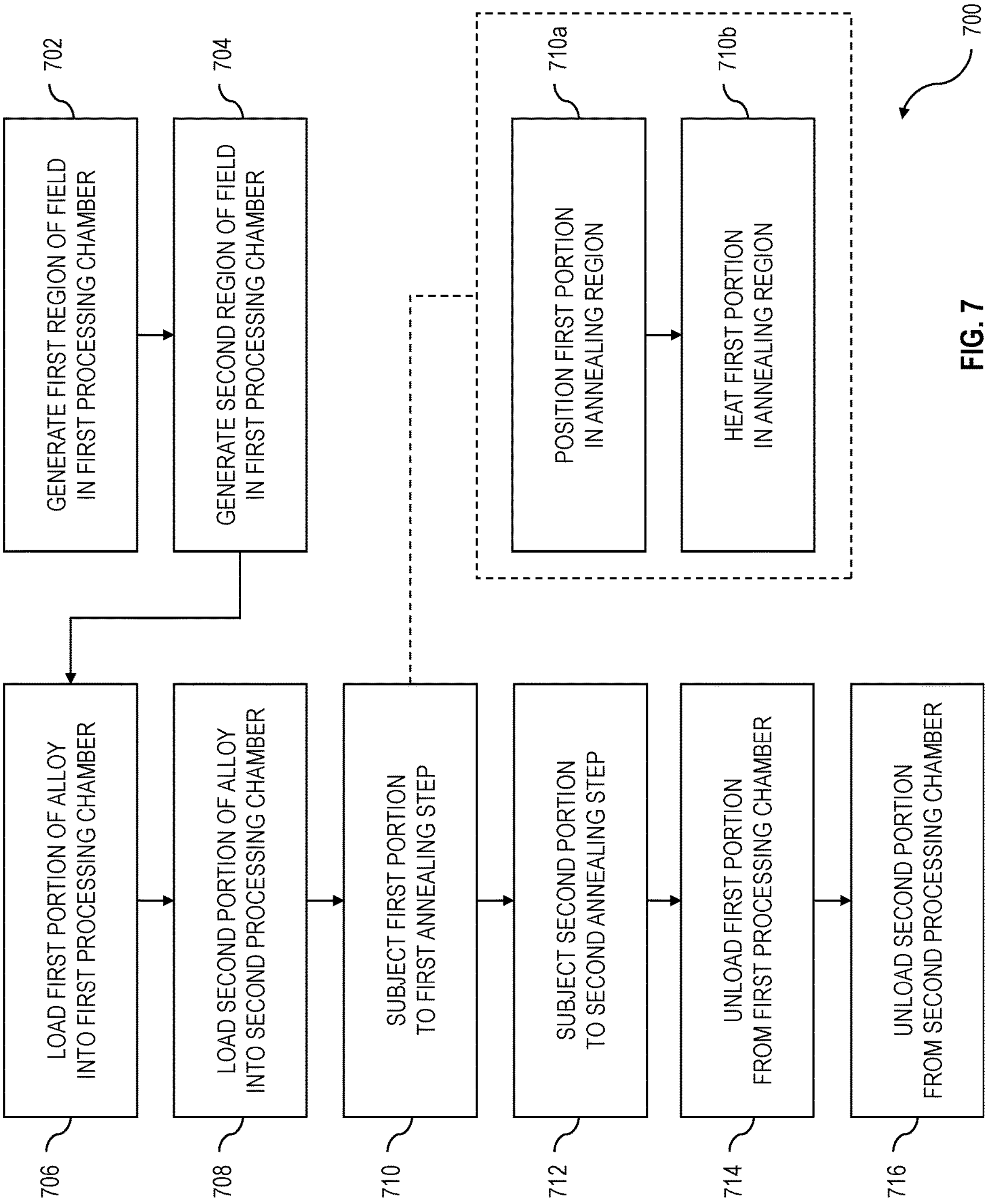
FIG. 7 is a flow chart of a method, according to an exemplary implementation.

FIG. 7 is a flow chart for an exemplary method 700 for processing a material, such as the material 150, using microwave energy. At stage 702, a first region (such as the first region 120*a*) of a pure magnetic field can be generated in a first processing zone (such as the microwave radiation zone 102) using a microwave radiation source of the first processing zone (such as the microwave radiation source 112). Stage 702 can be analogous to stage 502 (of method 500). At stage 704, a second region (such as the second region 120*b*) of a pure electric field can be generated in the first processing zone (102) using the microwave radiation source (112). Stage 704 can be analogous to stage 504. At stage 706, a first portion (such as the first portion 151) of an amorphous alloy (such as the material 150) is loaded into the first processing zone (102). Stage 706 can be analogous to stage 506. At stage 708, a second portion (such as the second portion 152) of the amorphous alloy (150) is loaded into a second processing zone. The second processing zone can be an annealing chamber that is, for example, the same as the first processing zone. In some implementations, the second processing zone can be a single mode microwave radiation chamber (such as the microwave radiation zone 102) or a multi-mode microwave radiation chamber. In some implementations, the second processing zone includes a stress annealing system, a thermal annealing system (for example, a tube furnace), or any combination of these. For example, the second processing zone can include a combination of a stress annealing system and a thermal annealing system, such as a furnace including a tension annealing system.

At stage 710, the first portion (151) can be subjected to a first annealing step. The first annealing step includes the stages 710*a* and 710*b*. At stage 710*a*, the first portion (151) is positioned in an annealing region. The annealing region can be a single field region selected from the first region (120*a*) and the second region (120*b*). Stage 710*a* can be analogous to stage 508. At stage 710*b*, the first portion (151) is heated in the annealing region. Stage 710*b* can be analogous to stage 510.

At stage 712, the second portion (152) can be subjected to a second annealing step, while the first portion (151) is subjected to the first annealing step at stage 710. For example, the first portion 151 can be subjected to the first annealing step simultaneously as the second portion 152 is subjected to the second annealing step. The second annealing step can be substantially the same as the first annealing step, but for the second portion (152). In some implementations, the second annealing step includes one or more processing steps, such as single mode microwave radiation annealing (like the first annealing step at stage 710), multi-mode microwave radiation annealing, stress annealing, conduction heating, rolling, surface coating, applying an external magnetic field, or any combination of these.

At stage 714, the first portion (151) is automatically unloaded out of the first processing zone (102). Stage 714 can be analogous to stage 512. At stage 716, the second portion (152) is automatically unloaded out of the second processing zone, while the first portion (151) is automatically unloaded out of the first processing zone (102). For example, the first portion 151 is automatically unloaded from the first processing zone (102) simultaneously as the second portion 152 is automatically unloaded from the second processing zone.

Figures 8A, 8B, 8C, 8D:
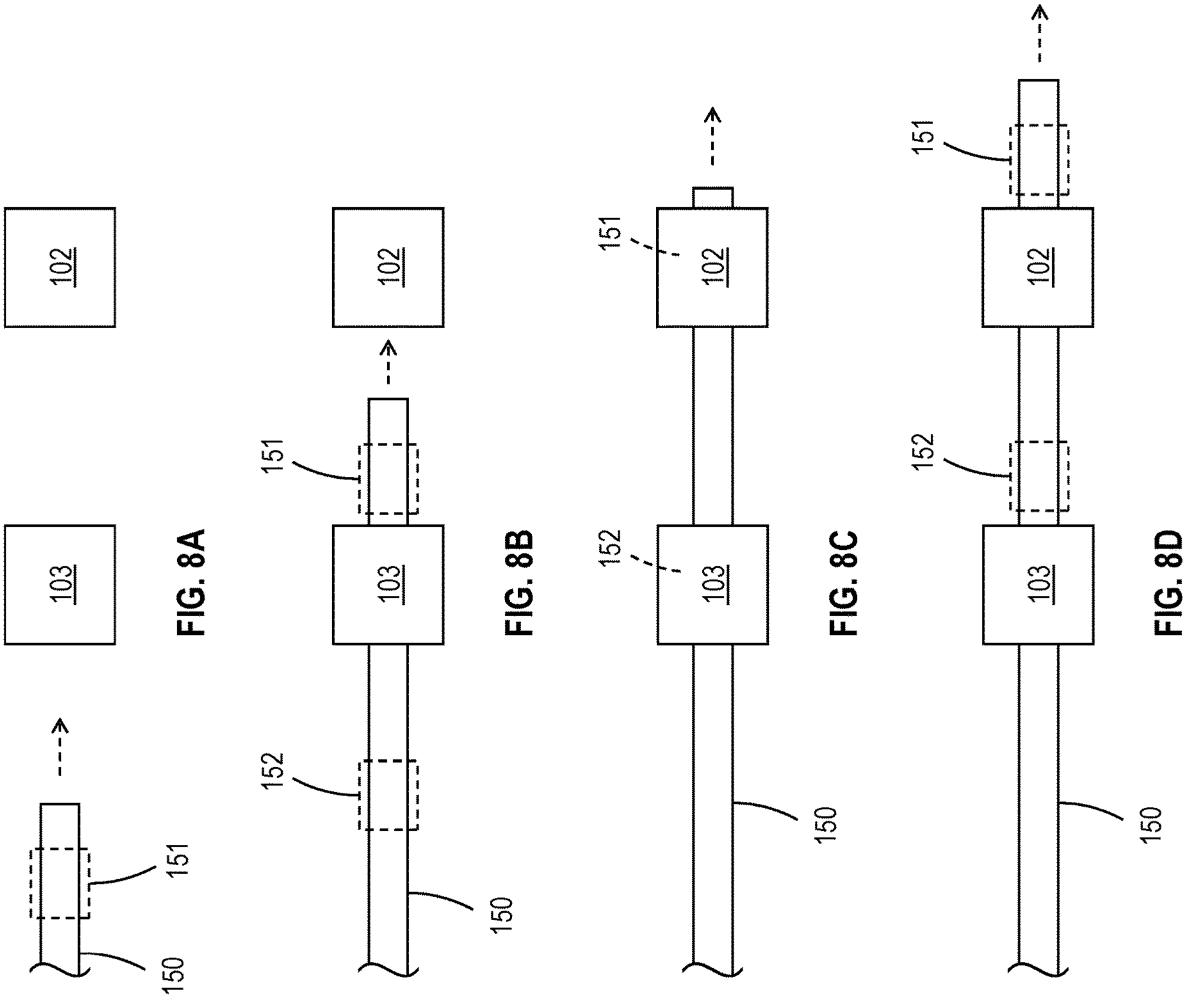
FIGS. 8A, 8B, 8C, and 8D are schematic diagrams illustrating an exemplary progression of the method of FIG. 7.

FIGS. 8A, 8B, 68C, and 8D are schematic diagrams illustrating an exemplary progression of an implementation of the method 700. FIG. 8A illustrates a first portion 151 of an amorphous alloy (150) before being loaded to a first processing zone 102 and a second processing zone 103. FIG. 8B illustrates stages 706 and 708 (of method 700). The first portion 151 of the amorphous alloy 150 is loaded into the first processing zone 102 (stage 706). While the first portion 151 is loaded into the first processing zone 102 at stage 706, the second portion 152 can be loaded into the second processing zone 103 (stage 708). FIG. 8C illustrates stages 710 and 712. The first portion 151 can be subjected to a first annealing step in the first processing zone 102 (stage 710). While the first portion 151 is subjected to the first annealing step in the first processing zone 102 at stage 710, the second portion 152 can be subjected to a second annealing step in the second processing zone 103 (stage 712). FIG. 8D illustrates stages 714 and 716. The first portion 151 can be unloaded from the first processing zone 102 (stage 714). While the first portion 151 is unloaded from the first processing zone 102 at stage 714, the second portion 152 can be unloaded from the second processing zone 103 (stage 716).

Figure 9:
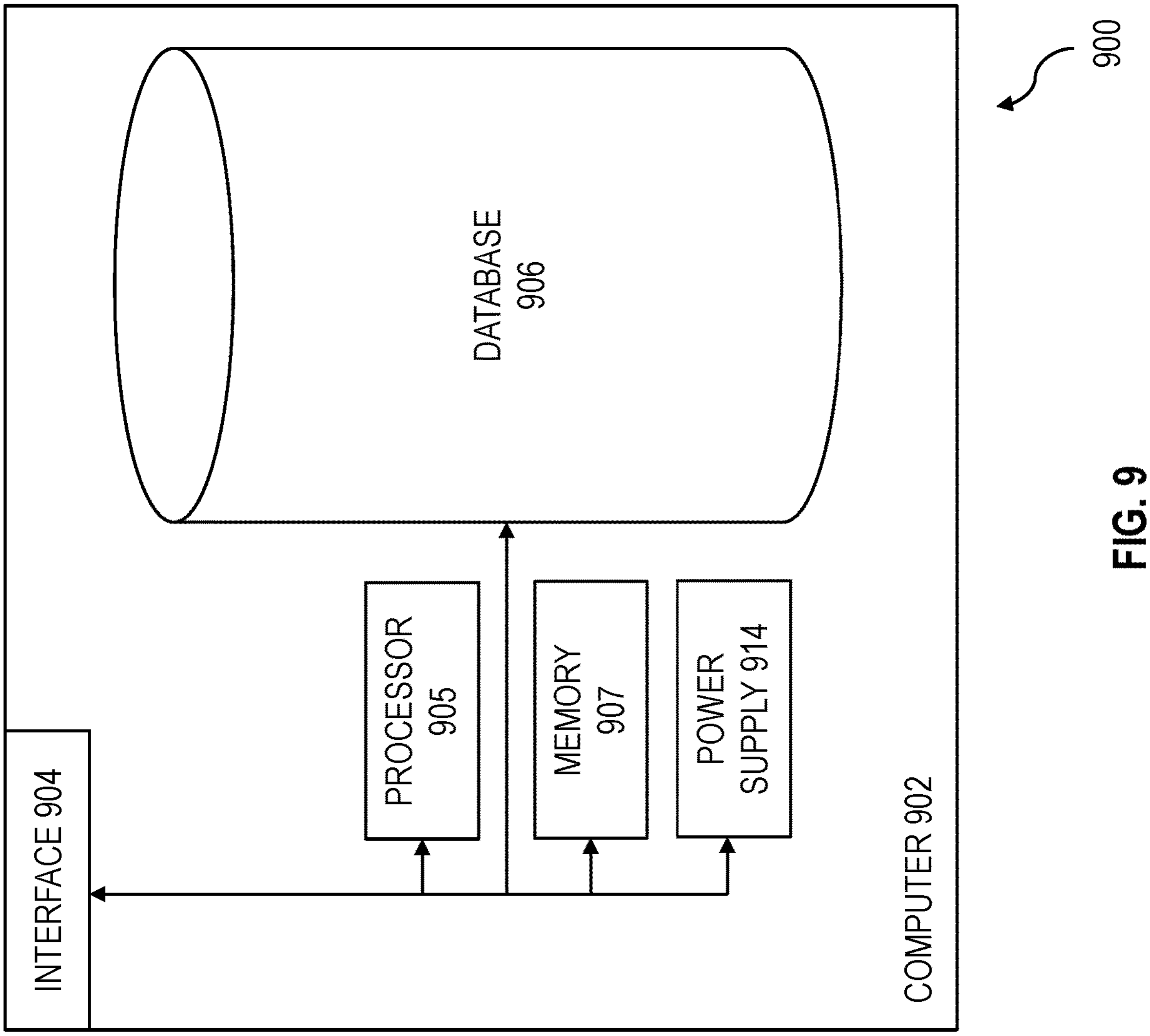
FIG. 9 is a block diagram of a computer system, according to an exemplary implementation.

FIG. 9 is a block diagram of an exemplary controller 900 used to provide computational functionalities associated with described algorithms, methods, functions, processes, flows, and procedures, as described in this specification. In some implementations, the controller 900 can be a computer system that includes a computer 902. The illustrated computer 902 is intended to encompass any computing device such as a server, desktop computer, laptop/notebook computer, one or more processors within these devices, or any other suitable processing device, including physical or virtual instances (or both) of the computing device. Additionally, the computer 902 can include a computer that includes an input device, such as a keypad, keyboard, touch screen, or other device that can accept user information, and an output device that conveys information associated with the operation of the computer 902, including digital data, visual, audio information, or a combination of information.

In some implementations, the computer 902 includes a processor 905. Although illustrated as a single processor 905 in FIG. 9, two or more processors can be used according to particular needs, desires, or particular implementations of the computer 902. Generally, the processor 905 executes instructions and manipulates data to perform the operations of the computer 902 and any algorithms, methods, functions, processes, flows, and procedures as described in this specification. In some implementations, the computer 902 includes one or more integrated circuits with built-in logic (for example, application-specific integrated circuits).

In some implementations, the computer 902 includes a database 906 that can hold data for the computer 902 or other components (or a combination of both) that can be connected to the network. Although illustrated as a single database 906 in FIG. 9, two or more databases (of the same or combination of types) can be used according to particular needs, desires, or particular implementations of the computer 902 and the described functionality. While database 906 is illustrated as an integral component of the computer 902, in some implementations, the database 906 can be external to the computer 902.

In some implementations, the computer 902 includes a memory 907 that can hold data for the computer 902 or other components (or a combination of both) that can be connected to the network. The memory 907 can be a transitory or non-transitory storage medium. Although illustrated as a single memory 907 in FIG. 9, two or more memories 907 (of the same or combination of types) can be used according to particular needs, desires, or particular implementations of the computer 902 and the described functionality. While memory 907 is illustrated as an integral component of the computer 902, in some implementations, the memory 907 can be external to the computer 902.

The memory 907 can store computer-readable instructions executable by the processor 905 that, when executed, cause the processor 905 (or multiple processors) to perform operations, such as controlling the rate at which an amorphous alloy passes through the microwave radiation zone 102, controlling the application of stress and amount of stress applied on an amorphous alloy as the amorphous alloy passes through the microwave radiation zone 102, controlling the microwave energy used to heat the amorphous alloy as the amorphous alloy passes through the microwave radiation zone 102, determining a property of the amorphous alloy as the amorphous alloy passes through the microwave radiation zone 102 based on signals received from one or more sensors. In some implementations, the computer 902 includes a power supply 914. The power supply 914 can include a rechargeable or non-rechargeable battery that can be configured to be either user- or non-user-replaceable. The power supply 914 can be hard-wired. There can be any number of computers 902 associated with, or external to, a computer system containing computer 902, each computer 902 communicating over the network. Further, the term "client," "user," "operator," and other appropriate terminology can be used interchangeably, as appropriate, without departing from the scope of this specification. Moreover, this specification contemplates that many users can use one computer 902, or that one user can use multiple computers 902.

Exemplary Embodiments

Some exemplary embodiments are described in paragraph [0001] to [0041] below.

A method, comprising:
- generating a first region of a pure magnetic field in a first processing zone using a microwave radiation source of the first processing zone, wherein the first processing zone is a single mode microwave radiation chamber;
- generating a second region of a pure electric field in the first processing zone using the microwave radiation source, wherein the second region is spatially distinct from the first region;
- loading, automatically, a first portion of an amorphous alloy into the first processing zone;
- positioning the first portion in an annealing region, wherein the annealing region is a single field region selected from the first region and the second region;
- heating the first portion in the annealing region; and
- unloading, automatically, the first portion from the first processing zone.

The method of the embodiment of paragraph [0001], further comprising applying a magnitude of stress to the first portion while heating the first portion in the annealing region.

The method of any one of the embodiments of paragraphs [0001]-[0002], further comprising:
- loading, automatically, the first portion into a second processing zone selected from a single mode microwave radiation chamber, a multi-mode microwave radiation chamber, and a furnace;
- subjecting the first portion to an annealing step in the second processing zone; and
- unloading, automatically, the first portion from the second processing zone.

The method of any one of the embodiments of paragraphs [0001]-[0003], further comprising:
- loading, automatically, a second portion of the alloy into the first processing zone;
- positioning the second portion in the annealing region;
- heating the second portion in the annealing region; and
- unloading, automatically, the second portion from the first processing zone.

The method of the embodiment of paragraph [0004] wherein the second portion, after being heated in the annealing region, exhibits magnetic properties selected from magnetic properties exhibited by the first portion after being heated in the annealing region and magnetic properties distinct from the magnetic properties exhibited by the first portion after being heated in the annealing region.

The method of any one of the embodiments of paragraphs [0001]-[0005], further comprising subjecting the first portion to one or more processing steps selected from single mode microwave radiation annealing, multi-mode microwave radiation annealing, stress annealing, magnetic field annealing, thermal annealing, and combinations thereof.

The method of any one of the embodiments of paragraph [0001]-[0006], further comprising cutting or winding the alloy into a tape wound core.

The method of any one of the embodiments of paragraph [0001]-[0007], wherein the first portion has a length of less than approximately 25 cm.

The method of any one of the embodiments of paragraph [0001]-[0007], wherein the first portion has a length of less than approximately 15 cm.

The method of any one of the embodiments of paragraph [0001]-[0007], wherein the first portion has a length of less than approximately 10 cm.

The method of any one of the embodiments of paragraph [0001]-[0007], wherein the first portion has a length of less than approximately 8 cm.

The method of any one of the embodiments of paragraph [0001]-[0007], wherein the first portion has a length of less than approximately 3 cm.

The method of any one of the embodiments of paragraph [0001]-[0007], wherein the first portion has a length of less than approximately 1 cm.

The method of any one of the embodiments of paragraph [0001]-[0007], wherein the first portion has a length of between approximately 0.5 cm and approximately 25 cm.

The method of any one of the embodiments of paragraph [0001]-[0014], wherein heating the first portion in the annealing region comprises heating the first portion to a temperature of between approximately 400° C. and approximately 700° C.

The method of any one of the embodiments of paragraph [0001]-[0015], wherein heating the second portion in the annealing region comprises heating the second portion to a temperature of between approximately 400° C. and approximately 700° C.

The method of any one of the embodiments of paragraph [0001]-[0016], wherein the alloy comprises iron, copper, carbon, nickel, cobalt, boron, phosphorus, silicon, chromium, tantalum, niobium, vanadium, aluminum, molybdenum, manganese, tungsten, zirconium, zinc, or combinations thereof.

The method of any one of the embodiments of paragraph [0001]-[0016], wherein the alloy comprises cobalt, iron, manganese, niobium, silicon, and boron.

The method of any one of the embodiments of paragraph [0001]-[0016], wherein the alloy comprises:

80 atomic % or less of one or more metals selected from cobalt, iron, and manganese; and 20 atomic % of niobium, silicon, and boron.

The method of any one of the embodiments of paragraph [0001]-[0016], wherein the alloy comprises:

80 atomic % or less of one or more metals selected from cobalt, iron, and manganese;

4 atomic % of niobium;

2 atomic % of silicon; and 14 atomic % of boron.

The method of any one of the embodiments of paragraph [0001]-[0020], further comprising measuring a thickness of the alloy.

The method of any one of the embodiments of paragraph [0001]-[0021], further comprising measuring a width of the alloy.

The method of any one of the embodiments of paragraph [0001]-[0021], further comprising measuring a permeability of the alloy.

The method of any one of the embodiments of paragraph [0001]-[0022], further comprising measuring a temperature of the alloy.

The method of any one of the embodiments of paragraph [0001]-[0024], further comprising measuring a magnetic property of the alloy.

The method of any one of the embodiments of paragraph [0002]-[0025], wherein heating the first portion in the annealing region is adjusted based on at least one of the measured thickness, the measured width, the measured permeability, the measured temperature, and the measured magnetic property.

The method of any one of the embodiments of paragraph [0002]-[0026], further comprising adjusting the magnitude of stress applied to the first portion while heating the first portion in the annealing region.

The method of the embodiment of paragraph [0027], wherein the magnitude of stress applied to the first portion is adjusted based on at least one of the measured thickness, the measured width, the measured permeability, and the measured temperature.

A method, comprising:

generating a first region of a pure magnetic field in a first processing zone using a microwave radiation source of the first processing zone, wherein the first processing zone is a single mode microwave radiation chamber;

generating a second region of a pure electric field in the first processing zone using the microwave radiation source, wherein the second region is spatially distinct from the first region;

loading, automatically, a first portion of an amorphous alloy into the first processing zone;

while loading the first portion, loading, automatically, a second portion of the amorphous alloy into a second processing zone, wherein the second processing zone is selected from a single mode microwave radiation chamber, a multi-mode microwave radiation chamber, a stress annealing system, a thermal annealing system, and combinations thereof;

subjecting the first portion to a first annealing step, the first annealing step comprising:

positioning the first portion in an annealing region, wherein the annealing region is a single field region selected from the first region and the second region; and heating the first portion in the annealing region;

while subjecting the first portion to the first annealing step, subjecting the second portion to a second annealing step;

unloading, automatically, the first portion from the first processing zone; and while unloading the first portion, unloading, automatically, the second portion from the second processing zone.

A single mode microwave radiation chamber, comprising:

a microwave radiation source configured to generate, simultaneously, a pure magnetic field and a pure electric field spatially distinct from the pure magnetic field;

a first tube defining a first region, wherein the pure magnetic field generated by the microwave radiation source reaches a maximum magnetic field strength in the first region; and a second tube defining a second region, wherein the pure electric field generated by the microwave radiation source reaches a maximum electric field strength in the second region.

The single mode microwave radiation chamber of the embodiment of paragraph [0030], further comprising a 90-degree elbow deflector configured to uniformly distribute at least one of the pure magnetic field and the pure electric field across a dimension of a material passing through the single mode microwave radiation chamber, the dimension transverse to a direction of the material passing through the single mode microwave radiation chamber.

A system, comprising:

a first microwave radiation zone, wherein the first microwave radiation zone is a single mode microwave radiation chamber;

a material loading portion configured to load a material into the first microwave radiation zone; and a controller in communication with the first microwave radiation zone and the material loading portion, wherein the controller is configured to perform operations comprising transmitting signals to control the first microwave radiation zone and the material loading portion.

The system of the embodiment of paragraph [0032], wherein the first microwave radiation zone is a microwave radiation chamber according to any one of the embodiments of paragraphs [0030]-[0031].

The system of any one of the embodiments of paragraphs [0032]-[0033], further comprising a second microwave radiation zone.

The system of the embodiment of paragraph [0034], wherein the second microwave radiation zone is selected from a single mode microwave radiation chamber and a multi-mode microwave radiation chamber.

The system of the embodiment of paragraph [0034], wherein the second microwave radiation zone is a microwave radiation chamber according to any one of the embodiments of paragraphs [0030]-[0031].

The system of any one of the embodiments of paragraphs [0031]-[0036], further comprising one or more additional processing zones selected from a single mode microwave radiation chamber, a multi-mode microwave radiation chamber, a stress annealing system, a thermal annealing furnace, an external magnetic field, and combinations thereof.

The system of any one of the embodiments of paragraphs [0031]-[0037], wherein the material loading portion is a de-spooler configured to unwind a tape wound core.

The system of any one of the embodiments of paragraphs [0031]-[0038], wherein the system further comprises a material collecting portion configured to collect a material from the first microwave radiation zone.

The system of the embodiment of paragraph [0039], wherein the material collecting portion is an up-spooler configured to wind a material to form a tape wound core.

The system of any one of the embodiments of paragraphs [0039]-[0040], wherein the controller comprises:

at least one hardware processor;

a computer-readable storage medium coupled to the at least one hardware processor and storing programming instructions for execution by the at least one hardware processor, wherein the programming instructions, when executed, cause the at least one hardware processor to perform operations comprising:

transmitting a signal to adjust a speed at which the material loading portion loads material into the first microwave radiation zone;

transmitting a signal to adjust a speed at which the material collecting portion collects material from the first microwave radiation zone.

transmitting a signal to adjust a temperature within the first microwave radiation zone;

transmitting a signal to apply a magnitude of stress on a material positioned in the first microwave radiation zone; and recording information.

Other Embodiments

While this disclosure contains many specific implementation details, these should not be construed as limitations on the scope of the subject matter or on the scope of what can be claimed, but rather as descriptions of features that can be specific to particular implementations. Certain features that are described in this disclosure in the context of separate implementations can also be implemented, in combination, in a single implementation. Conversely, various features that are described in the context of a single implementation can also be implemented in multiple implementations, separately, or in any suitable sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results.

Accordingly, the previously described example implementations do not define or constrain this disclosure. Other changes, substitutions, and alterations are also possible without departing from the spirit and scope of this disclosure.

What is claimed is:

1. A method comprising:

generating a first region of a pure magnetic field in a first processing zone using a microwave radiation source of the first processing zone, wherein the first processing zone is a single mode microwave radiation chamber;

generating a second region of a pure electric field in the first processing zone using the microwave radiation source, wherein the second region is spatially distinct from the first region;

loading, automatically, a first portion of an amorphous alloy into the first processing zone;

positioning the first portion in an annealing region, wherein the annealing region is a single field region selected from the first region and the second region;

heating the first portion in the annealing region;

applying a tension strain to the first portion while heating the first portion in the annealing region; and unloading, automatically, the first portion from the first processing zone.

2. The method of claim 1, further comprising:

loading, automatically, the first portion into a second processing zone selected from a single mode microwave radiation chamber, a multi-mode microwave radiation chamber, and a furnace;

subjecting the first portion to an annealing step in the second processing zone; and unloading, automatically, the first portion from the second processing zone.

3. The method of claim 1, further comprising:

loading, automatically, a second portion of the alloy into the first processing zone;

positioning the second portion in the annealing region;

heating the second portion in the annealing region; and unloading, automatically, the second portion from the first processing zone.

4. The method of claim 3, wherein the second portion, after being heated in the annealing region, exhibits magnetic properties selected from magnetic properties exhibited by the first portion after being heated in the annealing region and magnetic properties distinct from the magnetic properties exhibited by the first portion after being heated in the annealing region.

5. The method of claim 1, further comprising subjecting the first portion to one or more processing steps selected from single mode microwave radiation annealing, multi-mode microwave radiation annealing, stress annealing, magnetic field annealing, thermal annealing, and combinations thereof.

6. The method of claim 1, wherein the first portion has a length of between approximately 0.5 cm and approximately 25 cm.

7. The method of claim 1, wherein heating the first portion in the annealing region comprises heating the first portion to a temperature of between approximately 400° C. and approximately 700° C.

8. The method of claim 1, wherein heating the second portion in the annealing region comprises heating the second portion to a temperature of between approximately 400° C. and approximately 700° C.

9. The method of claim 1, further comprising measuring a thickness of the alloy.

10. The method of claim 1, further comprising at least one of measuring a width of the alloy, measuring a permeability of the alloy, measuring a temperature of the alloy, or measuring a magnetic property of the alloy.

11. The method of claim 1, wherein heating the first portion in the annealing region is adjusted based on at least one of the measured thickness, the measured width, the measured permeability, the measured temperature, and the measured magnetic property.

12. The method of claim 1, further comprising adjusting the tension strain applied to the first portion while heating the first portion in the annealing region.

13. The method of claim 12, wherein the tension strain applied to the first portion is adjusted based on at least one of the measured thickness, the measured width, the measured permeability, and the measured temperature.

14. The method of claim 12, wherein the tension strain applied to the first portion is adjusted in a linear manner.

15. The method of claim 12, wherein the tension strain applied to the first portion is adjusted in a cyclical manner.

16. The method of claim 1, wherein applying the tension strain to the first portion alters a permeability of the amorphous alloy.

* * * * *